US009736394B2

(12) United States Patent
Shintani et al.

(10) Patent No.: US 9,736,394 B2
(45) Date of Patent: Aug. 15, 2017

(54) IMAGE PROCESSING APPARATUS, IMAGING APPARATUS, IMAGE PROCESSING METHOD, AND COMPUTER-READABLE RECORDING MEDIUM

(71) Applicant: Olympus Corporation, Shibuya-ku, Tokyo (JP)

(72) Inventors: Koichi Shintani, Hachioji (JP); Osamu Nonaka, Sagamihara (JP); Kunio Yamamiya, Sagamihara (JP); Masaomi Tomizawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/050,569

(22) Filed: Feb. 23, 2016

(65) Prior Publication Data

US 2016/0255320 A1   Sep. 1, 2016

(30) Foreign Application Priority Data

Feb. 26, 2015 (JP) ................................. 2015-036878

(51) Int. Cl.
H04N 5/228 (2006.01)
H04N 5/235 (2006.01)
H04N 5/58 (2006.01)
H04N 9/64 (2006.01)
H04N 5/262 (2006.01)
H04N 1/60 (2006.01)
G06T 5/50 (2006.01)

(52) U.S. Cl.
CPC ............ H04N 5/2621 (2013.01); G06T 5/50 (2013.01); H04N 1/6027 (2013.01); H04N 5/2355 (2013.01)

(58) Field of Classification Search
CPC ..... G06T 3/0068; G06T 7/0024; H04N 9/646; H04N 9/643; H04N 9/74; H04N 9/045; H04N 5/2625; H04N 5/2621; H04N 1/6027
USPC ........... 348/225.1, 229.1, 246, 241; 382/274, 382/275
See application file for complete search history.

(56) References Cited

U.S. PATENT DOCUMENTS

2001/0048476 A1* 12/2001 Nakamura ............. H04N 9/735
348/252
2004/0036775 A1*  2/2004 Watson, Jr. .......... H04N 5/2355
348/207.1
(Continued)

FOREIGN PATENT DOCUMENTS

JP    2012-204952    10/2012

Primary Examiner — Xi Wang
(74) Attorney, Agent, or Firm — John C. Pokotylo; Straub & Pokotylo

(57) ABSTRACT

An image processing apparatus includes: an image acquisition unit configured to acquire a plurality of image data obtained by imaging a same subject; a saturation enhancement unit configured to execute saturation enhancement processing of enhancing saturation of at least a partial area of each of the plurality of image data; and a composite image generation unit configured to compare corresponding areas in the plurality of image data after the saturation enhancement processing to select an area having the highest saturation, and execute composition processing of generating composite image data formed of the selected area.

13 Claims, 15 Drawing Sheets

(56) References Cited

U.S. PATENT DOCUMENTS

| | | | |
|---|---|---|---|
| 2004/0100565 A1* | 5/2004 | Chen | G06T 3/4038 348/229.1 |
| 2004/0246267 A1* | 12/2004 | Oohara | G09G 5/02 345/591 |
| 2005/0052551 A1* | 3/2005 | Tsunoda | H04N 5/23293 348/231.6 |
| 2005/0169555 A1* | 8/2005 | Hasegawa | H04N 1/407 382/284 |
| 2006/0198623 A1* | 9/2006 | Ono | G03B 13/32 396/89 |
| 2009/0034837 A1* | 2/2009 | Kato | H04N 1/60 382/167 |

* cited by examiner

FIG.12

| SCENE | BASE HUE | COMPOSITION METHOD | NUMBER OF IMAGES SHOT |
|---|---|---|---|
| LANDSCAPE | GREEN (120°) | HDR COMPOSITION | - IMAGES |
| NIGHT SCENE | YELLOW (80°) | SAME/CONTINUOUS EXPOSURE COMPOSITION | O IMAGES |
| SETTING SUN | ORANGE (50°) | HDR COMPOSITION | - IMAGES |
| BEACH | BLUE (250°) | HDR COMPOSITION | - IMAGES |
| SNOW | BLUE (250°) | HDR COMPOSITION | - IMAGES |
| STARRY SKY | YELLOW (80°) | SAME/CONTINUOUS EXPOSURE COMPOSITION | △ IMAGES |

IMAGE PROCESSING APPARATUS, IMAGING APPARATUS, IMAGE PROCESSING METHOD, AND COMPUTER-READABLE RECORDING MEDIUM

CROSS REFERENCE TO RELATED APPLICATION

This application is based upon and claims the benefit of priority from Japanese Patent Application No. 2015-036878, filed on Feb. 26, 2015, the entire contents of which are incorporated herein by reference.

BACKGROUND OF THE INVENTION

1. Field of the Invention

The present invention relates to an image processing apparatus, an imaging apparatus, an image processing method, and a computer-readable recording medium.

2. Description of the Related Art

There has been known in recent years an imaging apparatus performing HDR (High Dynamic Range) shooting which compensates for an insufficient dynamic range of an imaging element (refer to Japanese Laid-open Patent Publication No. 2012-204952, for example).

The imaging apparatus disclosed in Japanese Laid-open Patent Publication No. 2012-204952 performs HDR shooting that generates composite image data by compositing a plurality of image data acquired by continuously shooting (imaging for a plurality of times) the same subject while changing an exposure value (EV).

SUMMARY OF THE INVENTION

An image processing apparatus according to one aspect of the present invention includes: an image acquisition unit configured to acquire a plurality of image data obtained by imaging a same subject; a saturation enhancement unit configured to execute saturation enhancement processing of enhancing saturation of at least a partial area of each of the plurality of image data; and a composite image generation unit configured to compare corresponding areas in the plurality of image data after the saturation enhancement processing to select an area having the highest saturation, and execute composition processing of generating composite image data formed of the selected area.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 12 is a table illustrating an example of association information recorded in a recording unit illustrated in FIG. 10;

DETAILED DESCRIPTION OF THE PREFERRED EMBODIMENTS

Figure 1:
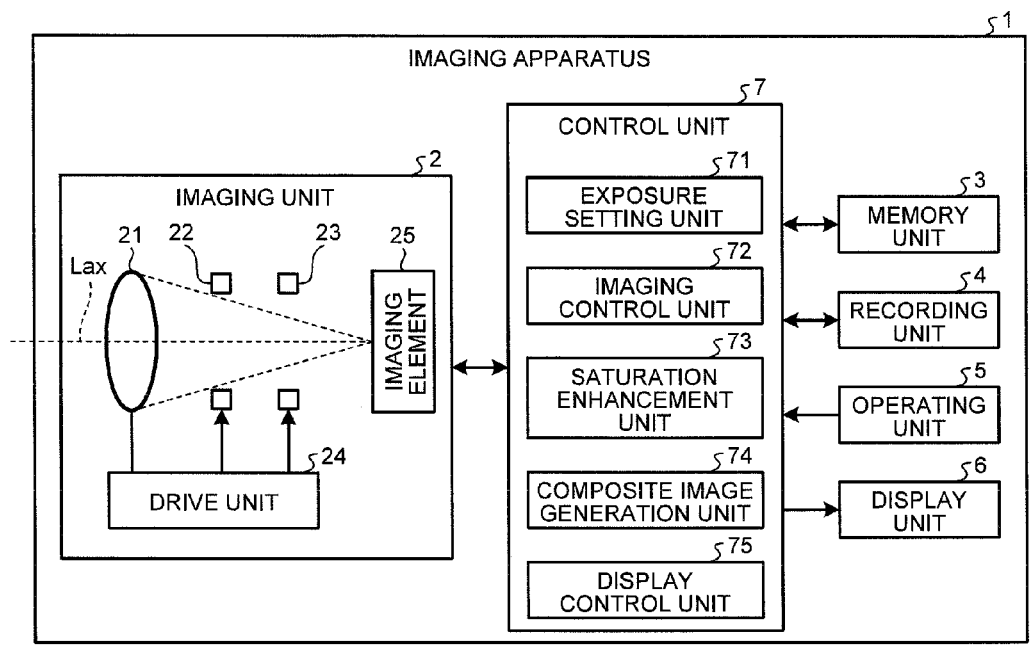
FIG. 1 is a block diagram illustrating a configuration of an imaging apparatus according to a first embodiment of the present invention.

Modes of carrying out the present invention (hereinafter referred to as embodiments) will now be described with reference to the drawings. The present invention is not to be limited by the embodiments described below. Moreover, an identical reference numeral is assigned to a part that is identical among the drawings.

First Embodiment

Schematic Configuration of Imaging Apparatus

FIG. 1 is a block diagram illustrating a configuration of an imaging apparatus 1 according to a first embodiment of the present invention.

The imaging apparatus 1 can be switched to various camera modes (such as a "playback mode" and a "vivid composition mode") according to a user operation by a camera user.

The "vivid composition mode" is a mode performing HDR shooting which compensates for an insufficient dynamic range of an imaging element by compositing a plurality of image data acquired by continuously shooting (imaging for a plurality of times) the same subject while changing an exposure value (EV).

The "playback mode" is a mode which displays image data (the aforementioned composite image data, for example) that is already shot and recorded.

A principal part (a function when the imaging apparatus 1 is set to the "vivid composition mode") of the present invention will be mainly described as the configuration of the imaging apparatus 1

The imaging apparatus 1 includes an imaging unit 2, a memory unit 3, a recording unit 4, an operating unit 5, a display unit 6, and a control unit 7 as illustrated in FIG. 1.

The imaging unit 2 images a subject and generates image data under control of the control unit 7. As illustrated in FIG. 1, the imaging unit 2 includes an optical system 21, a diaphragm 22, a shutter 23, a drive unit 24, and an imaging element 25.

The optical system 21 is an imaging optical system including at least a focus lens and a zoom lens, and forms an image of light condensed by the focus lens from a predetermined aperture region on a light receiving face of the imaging element 25.

The diaphragm 22 adjusts exposure by limiting an incident amount of the light condensed by the optical system 21.

The shutter 23 is formed of a focal plane shutter or the like and arranged on an incident side of a light path of the imaging element 25. The shutter 23 is switched to an exposure state in which the light condensed by the optical system 21 is made incident on the imaging element 25 or a light shielding state in which the light condensed by the optical system 21 is cut off.

Under control of the control unit 7, the drive unit 24 moves the optical system 21 along an optical axis Lax (FIG. 1), adjusts a stop amount of the diaphragm 22 (adjusts an F number), and switches the shutter 23 to the exposure state or the light shielding state.

The imaging element 25 is formed of a CCD (Charge Coupled Device) or a CMOS (Complementary Metal Oxide Semiconductor), and generates image data by performing photoelectric conversion on a subject image formed by the optical system 21.

While not specifically illustrated, there is provided on the light receiving face of the imaging element 25 a color filter in which a plurality of filter groups that is grouped according to a wavelength band of transmitted light is arrayed in a predetermined form (such as in a Bayer array).

More specifically, the color filter includes a red filter group transmitting light in the wavelength band corresponding to red, a blue filter group transmitting light in the wavelength band corresponding to blue, a first green filter group (arrayed in the same column as the red filter group) transmitting light in the wavelength band corresponding to green, and a second green filter group (arrayed in the same column as the blue filter group) transmitting light in the wavelength band corresponding to green.

That is, the image data generated by the imaging element 25 includes, for each pixel, an R signal (color component signal) corresponding to incident light through the red filter group, a B signal (color component signal) corresponding to incident light through the blue filter group, a first G signal (color component signal) corresponding to incident light through the first green filter group, and a second G signal (color component signal) corresponding to incident light through the second green filter group.

The memory unit 3 stores the image data generated by the imaging element 25 of the imaging unit 2.

The recording unit 4 records various programs and the like (including an image processing program according to the present invention) executed by the control unit 7. Moreover, the recording unit 4 records composite image data generated by the control unit 7 in response to a shooting operation performed by the camera user on the operating unit 5.

The operating unit 5 is formed of a button, a switch, and a touch panel accepting a user operation and outputs an instruction signal corresponding to the user operation to the control unit 7.

The display unit 6 is formed of a liquid crystal or organic EL (Electro Luminescence) display panel. The display unit 6 displays a predetermined image under control of the control unit 7.

The control unit 7 is formed of a CPU (Central Processing Unit) or the like, and has control over the operation of the imaging apparatus 1 by providing an instruction or transferring data to each unit forming the imaging apparatus 1 in accordance with the instruction signal or the like from the operating unit 5. As illustrated in FIG. 1, the control unit 7 includes an exposure setting unit 71, an imaging control unit 72, a saturation enhancement unit 73, a composite image generation unit 74, and a display control unit 75.

The exposure setting unit 71 operates the drive unit 24, causes the imaging unit 2 to perform imaging while changing an exposure value (EV) determined by the F number and shutter speed and, on the basis of each image data (live view image data) acquired by the imaging, sets the range of the exposure value (EV) when performing continuous shooting with HDR shooting (such setting will be hereinafter referred to as HDR metering).

The exposure setting unit 71 for example divides, into a plurality of areas, each live view image corresponding to each live view image data imaged while changing the exposure value (EV), and detects whether there exists crushed blacks or clipped whites while focusing on one of the plurality of areas. Then, the exposure setting unit 71 sets the range of the exposure value (EV) when performing continuous shooting with the HDR shooting to be from the exposure value (EV) with which a live view image including the area with crushed blacks is shot to the exposure value (EV) with which a live view image including the area with clipped whites is shot. The setting of the exposure value (EV) as described above can be executed by using a known multi-zone metering algorithm or an algorithm detecting the crushed blacks and clipped whites.

Note that the range of the exposure value (EV) may be set automatically by HDR metering as described above, or may be set as appropriate according to an operation (selection) performed by the camera user on the operating unit 5.

The imaging control unit 72 calculates the number of images continuously shot by HDR shooting on the basis of each live view image data acquired by HDR metering. Moreover, in response to a shooting operation performed by the camera user on the operating unit 5, the imaging control unit 72 operates the drive unit 24 and causes the imaging unit 2 to image the calculated number of images of a subject while changing the exposure value (EV) within the range set by the exposure setting unit 71. The imaging control unit 72 then stores a plurality of (corresponding to the calculated number of images of) image data (hereinafter referred to as HDR image data) acquired by the imaging into the memory unit 3.

That is, the imaging control unit 72 acquiring the plurality of HDR image data has a function as an image acquisition unit according to the present invention.

The saturation enhancement unit 73 acquires pixel data (R signal, B signal, and first and second G signals) for each pixel from each of the plurality of HDR image data stored in the memory unit 3 and executes saturation enhancement processing that enhances the saturation of the pixel data for each pixel.

More specifically, the saturation enhancement unit 73 enhances the saturation of the pixel data in the saturation enhancement processing such that a hue of the pixel data does not change, or while fixing the hue. Not changing the hue of the pixel data means that a balance of color components such as R, G and B is not changed, and enhancing the saturation means that each color component is amplified. However, an amplification rate of each color component may be finely adjusted to make a color closer to an attractive color or a preferred color.

After the saturation enhancement processing is executed, the composite image generation unit 74 selects a pixel with the highest saturation by comparing corresponding pixels in the plurality of HDR image data, and executes composition processing that generates composite image data formed of the selected pixel. The composite image generation unit 74 then records the generated composite image data in the recording unit 4.

Note that in the saturation enhancement processing and composition processing of the first embodiment, a pixel in which a signal level of at least any of the R signal, B signal, first G signal and second G signal is saturated (such pixel will be hereinafter referred to as a saturated pixel) and a pixel in which the signal level is lower than a noise level (such pixel will be hereinafter referred to as a noise pixel) are excluded.

The imaging control unit 72 (image acquisition unit), the saturation enhancement unit 73 and the composite image generation unit 74 described above have a function as the image processing apparatus according to the present invention.

The display control unit 75 controls the operation of the display unit 6 and causes the display unit 6 to display a predetermined image.

Operation of Imaging Apparatus

Next, an operation of the aforementioned imaging apparatus 1 (the image processing method according to the present invention) will be described.

Figure 2:
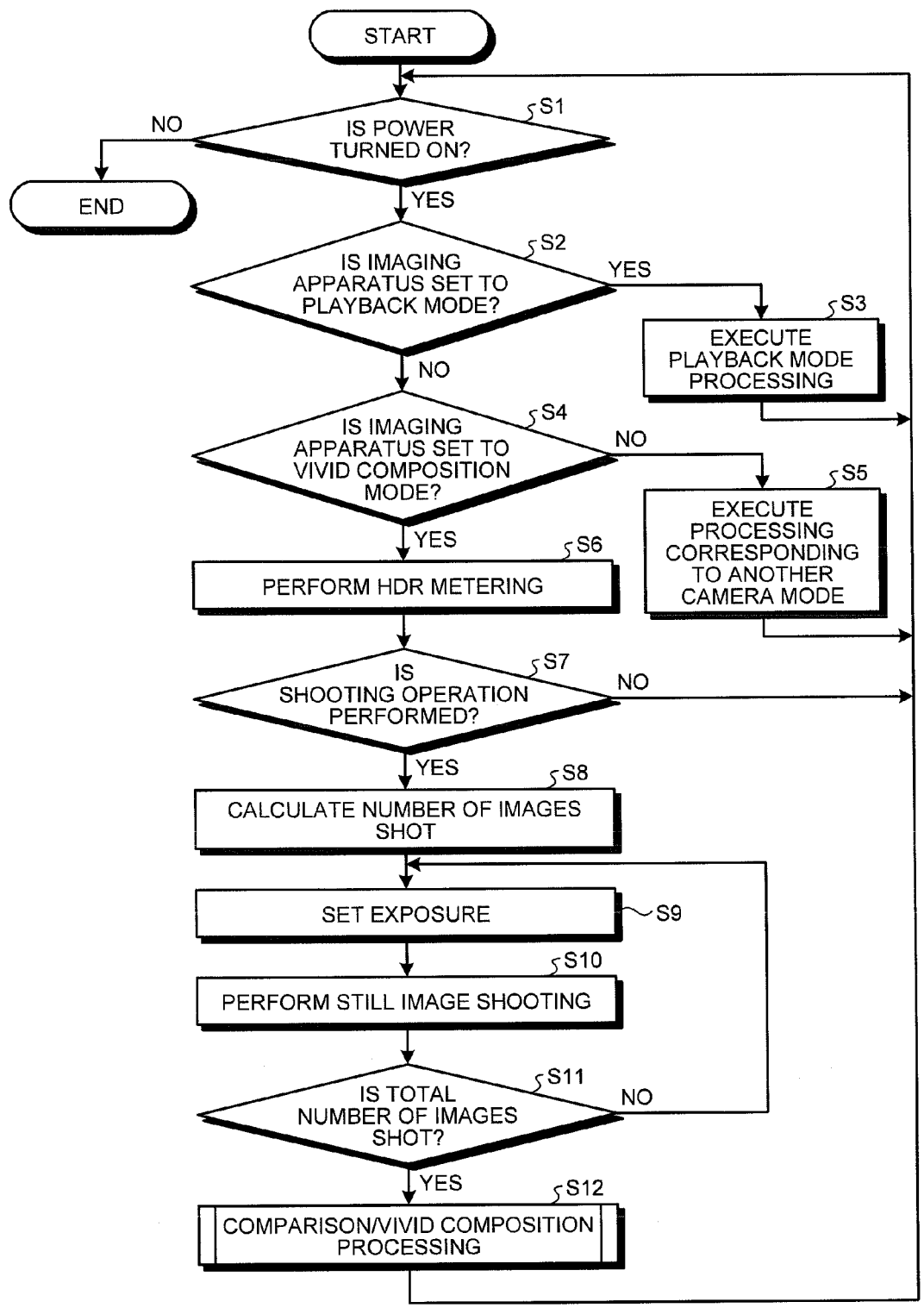
FIG. 2 is a flowchart illustrating an operation of the imaging apparatus illustrated in FIG. 1.

FIG. 2 is a flowchart illustrating the operation of the imaging apparatus 1.

When the power of the imaging apparatus 1 is turned on by a startup operation of the camera user performed on the operating unit 5 (step S1: Yes), the control unit 7 determines which camera mode the imaging apparatus 1 is set to (steps S2 and S4).

Figure 3:
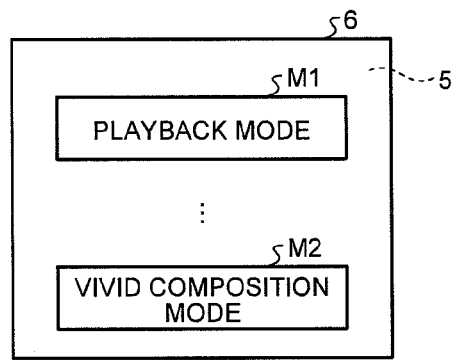
FIG. 3 is a diagram illustrating an example of a menu screen displayed on a display unit illustrated in FIG. 1.

FIG. 3 is a diagram illustrating an example of a menu screen displayed on the display unit 6.

The imaging apparatus 1 is set to the "playback mode" when, for example, an operation icon M1 on the menu screen illustrated in FIG. 3 is touched by an operation of the camera user on the operating unit (touch panel) 5. The imaging apparatus 1 is set to the "vivid composition mode" when an operation icon M2 is touched by an operation of the camera user on the operating unit 5.

When it is determined that the imaging apparatus 1 is set to the "playback mode" (step S2: Yes), the control unit 7 executes playback mode processing that causes the display unit 6 to display an image corresponding to the image data (such as the composite image data) recorded in the recording unit 4 (step S3). The imaging apparatus 1 thereafter returns to step S1.

On the other hand, when it is determined that the imaging apparatus 1 is not set to the "playback mode" (step S2: No), the control unit 7 determines whether or not the imaging apparatus 1 is set to the "vivid composition mode" (step S4).

When it is determined that the imaging apparatus 1 is not set to the "vivid composition mode" (step S4: No), the control unit 7 executes processing corresponding to another camera mode (step S5). The imaging apparatus 1 thereafter returns to step S1.

On the other hand, when it is determined that the imaging apparatus 1 is set to the "vivid composition mode" (step S4: Yes), the exposure setting unit 71 performs HDR metering to set the range of the exposure value (EV) in performing continuous shooting with HDR shooting (step S6).

Following step S6, the imaging control unit 72 determines whether or not a shooting operation by the camera user is performed on the operating unit 5 (step S7).

The imaging apparatus 1 returns to step S1 when it is determined that the shooting operation is not performed (step S7: No).

On the other hand, when it is determined that the shooting operation is performed (step S7: Yes), the imaging control unit 72 calculates the number of images continuously shot with HDR shooting on the basis of each live view image data acquired by HDR metering performed in step S6 (step S8).

Specifically, the imaging control unit 72 specifies a pixel with the minimum brightness value BVmin and a pixel with the maximum brightness value BVmax among all the pixels in all the live view images acquired by HDR metering. The imaging control unit 72 then calculates the number of images shot by the following expression (1).

$$\text{The number of images shot}=(BVmax-BVmin)/\text{exposure difference} \quad (1)$$

Here, the exposure difference in expression (1) indicates a difference (such as 0.5 EV) in the exposure values (EV) switched when performing continuous shooting with HDR shooting.

Following step S8, the imaging control unit 72 operates the drive unit 24 and sets the exposure value (EV) to the lowest in the range set in step S6 (step S9).

Following step S9, the imaging control unit 72 causes the imaging unit 2 to image (shoot a still image of) a subject (step S10: image acquisition step). The imaging control unit 72 thereafter stores, into the memory unit 3, the HDR image data acquired by the imaging.

Following step S10, the imaging control unit 72 determines whether or not the imaging unit 2 is done imaging the number of images of the subject calculated in step S8 (done shooting the total number of images) (step S11).

The imaging apparatus 1 returns to step S9 when it is determined that the total number of images is not shot yet (step S11: No). The imaging apparatus 1 then increases the exposure value (EV) by the exposure difference (such as 0.5 EV) in step S9 and causes the imaging unit 2 to image the subject with the exposure value (EV) in step S10.

When it is determined that shooting of the total number of images is completed as a result of repeating steps S9 to S11 (step S11: Yes), the control unit 7 executes comparison/vivid composition processing (step S12). The imaging apparatus 1 thereafter returns to step S1.

Comparison/Vivid Composition Processing

Figure 4:
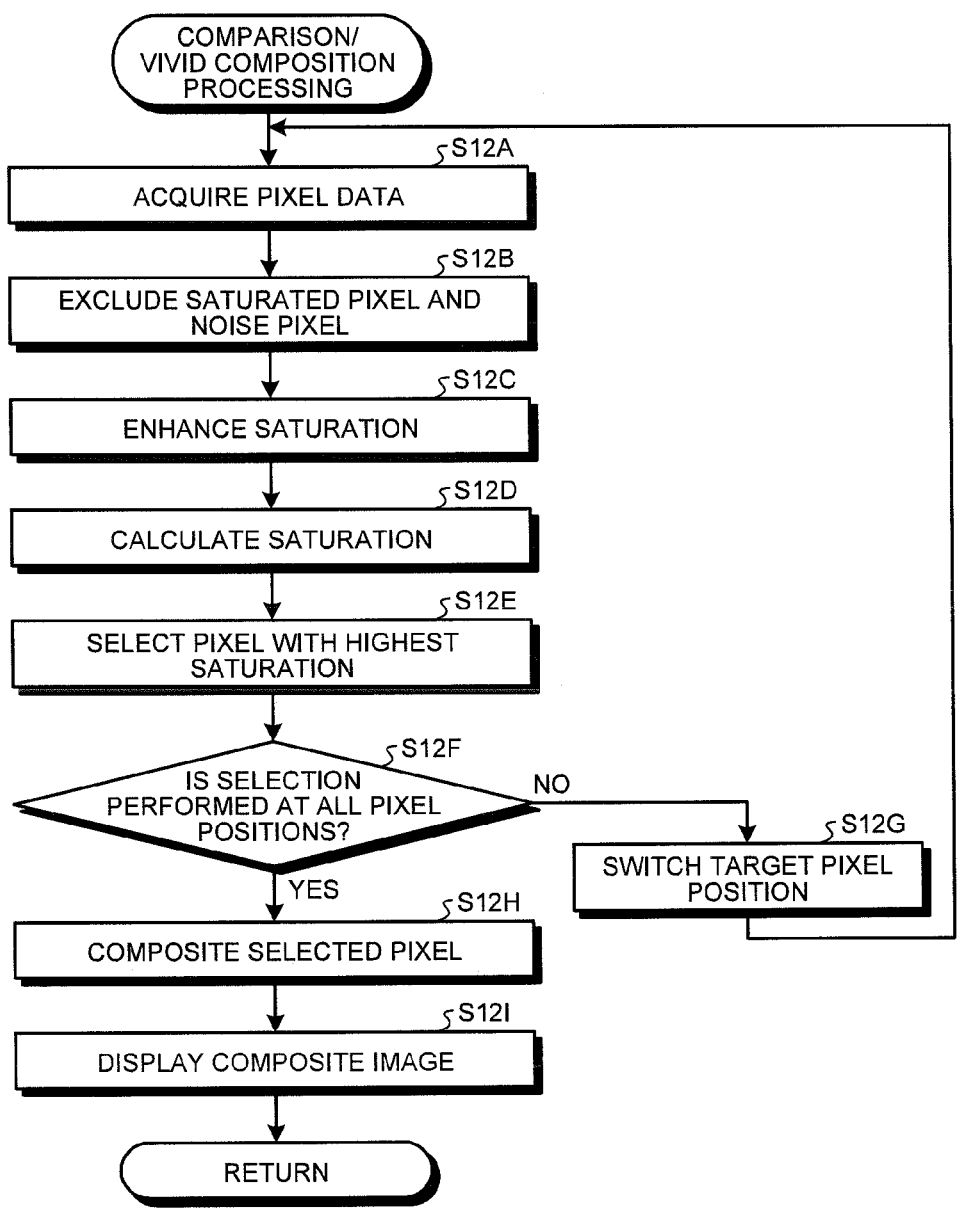
FIG. 4 is a flowchart illustrating comparison/vivid composition processing (step S12) illustrated in FIG. 2.

FIG. 4 is a flowchart illustrating the comparison/vivid composition processing (step S12) illustrated in FIG. 2.

First, the saturation enhancement unit 73 acquires pixel data of each pixel at a pixel position which will be a target (hereinafter referred to as a target pixel position) from the plurality of HDR image data stored in the memory unit 3 (step S12A).

Prior to executing the saturation enhancement processing, the saturation enhancement unit 73 after step S12A specifies a saturated pixel and a noise pixel on the basis of the pixel data of each pixel acquired in step S12A, and excludes the saturated pixel and the noise pixel from the pixel data subjected to the saturation enhancement processing (step S12B).

Figure 5A:
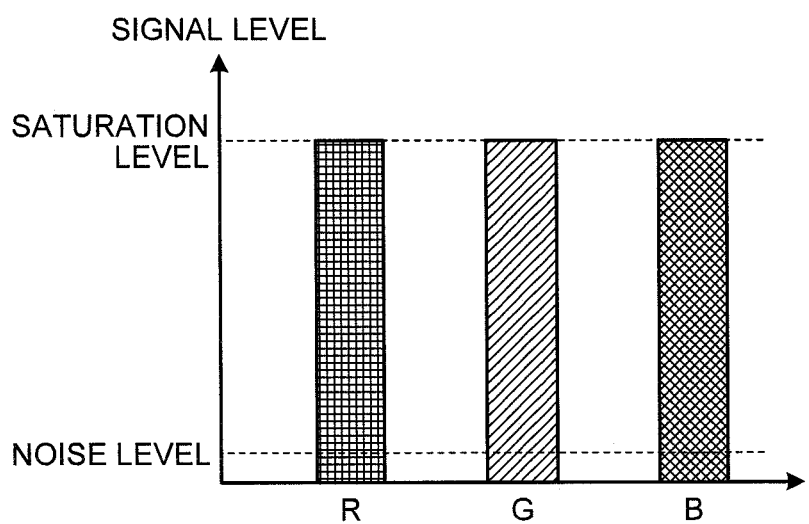
FIG. 5A is a graph illustrating step S12B illustrated in FIG. 4.
Figure 5B:
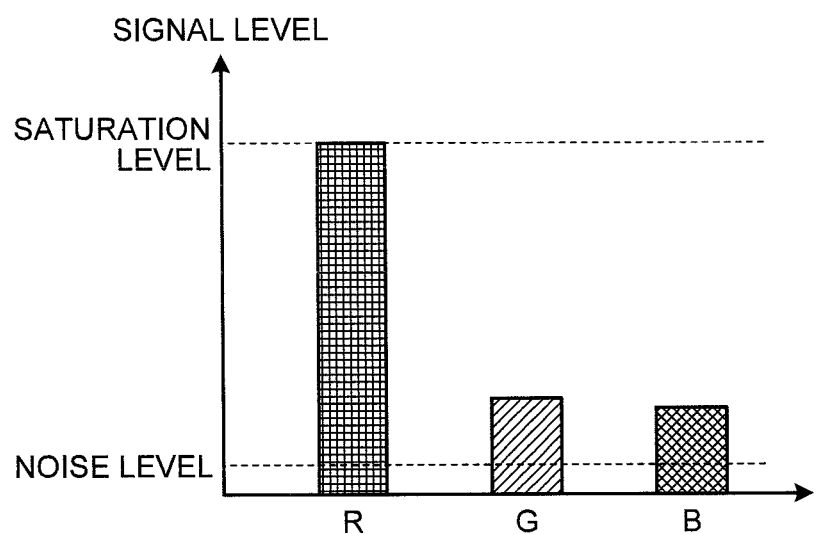
FIG. 5B is a graph illustrating step S12B illustrated in FIG. 4.

FIGS. 5A and 5B are graphs illustrating step S12B. Specifically, FIGS. 5A and 5B are graphs illustrating a signal level of each of the R, G, and B signals in the saturated pixel. Note that for convenience of description, the first and second G signals are collectively illustrated as a G signal in FIGS. 5A and 5B.

The saturation enhancement unit 73 for example specifies the saturated pixel as having clipped whites when the signal levels of all R, G, and B signals are saturated (at saturation levels) as illustrated in FIG. 5A. The saturation enhancement unit 73 specifies the saturated pixel as having washed-out color when the signal level of any of the R, G, and B signals is saturated as illustrated in FIG. 5A.

The saturation level in this case indicates a level at which a gradation value equals "255" when the R, G, B signals are expressed by an eight-bit gradation value, for example.

Moreover, the saturation enhancement unit 73 specifies the noise pixel as having crushed blacks when the signal levels of all R, G, and B signals are at or below the noise level (FIGS. 5A and 5B). The saturation enhancement unit 73 specifies the noise pixel as having washed-out color when the signal level of any of the R, G, and B signals is at or below the noise level.

The noise level in this case indicates a level at which the gradation value equals about "5" when the R, G, B signals are expressed by the eight-bit gradation value, for example.

Following step S12B, the saturation enhancement unit 73 executes the saturation enhancement processing on pixel data of a pixel not excluded in step S12B among the pixels at the target pixel position, while keeping the hue of the pixel unchanged (step S12C: a saturation enhancement step).

Figure 6:
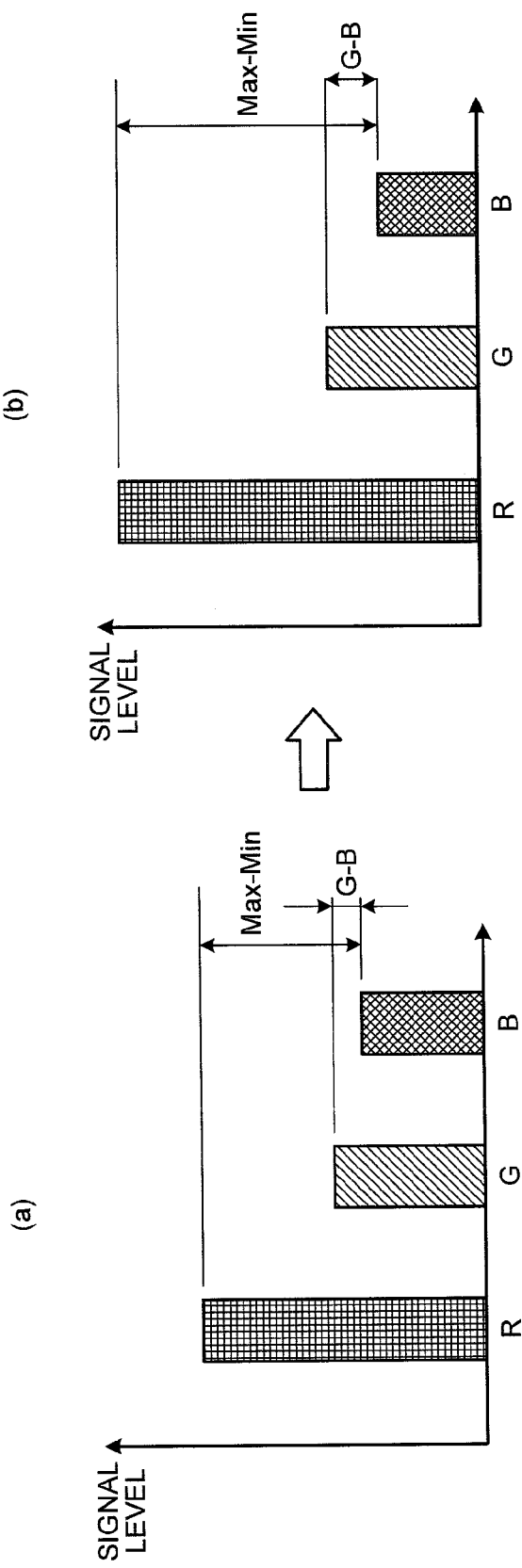
FIG. 6 is a graph illustrating step S12C illustrated in FIG. 4.

FIG. 6 is a graph illustrating step S12C. Specifically, similar to FIGS. 5A and 5B, FIG. 6 graphs illustrating the signal level of each of the R, G, and B signals of a certain pixel. FIG. 6(A) illustrates the signal level prior to executing the saturation enhancement processing, while FIG. 6(B) illustrates the signal level after executing the saturation enhancement processing.

Here, a hue H can be calculated by the following expressions (2) to (4) in an HSV color space, for example.

The hue H calculated by expression (2) is one when the signal level of the "R signal" is the highest among the R, G, B signals. The hue H calculated by expression (3) is one when the signal level of the "G signal" is the highest among the R, G, B signals. The hue H calculated by expression (4) is one when the signal level of the "B signal" is the highest among the R, G, B signals. In expressions (2) to (4), "R" represents the signal level of the R signal, "G" represents the signal level of the G signal, and "B" represents the signal level of the B signal. Moreover, "Max (RGB)" represents the highest signal level among the R, G, and B signals, and "Min (RGB)" represents the lowest signal level among the R, G, and B signals (the same is applied to expression (5)).

$$\text{Hue } H=(\{G-B\}/\{\text{Max}(RGB)-\text{Min}(RGB)\})\times 60° \quad (2)$$

$$\text{Hue } H=(\{B-R\}/\{\text{Max}(RGB)-\text{Min}(RGB)\})\times 60°+120° \quad (3)$$

$$\text{Hue } H=(\{R-G\}/\{\text{Max}(RGB)-\text{Min}(RGB)\})\times 60°+240° \quad (4)$$

That is, in the example illustrated in FIG. 6 where the R signal has the highest signal level and the B signal has the lowest signal level, the saturation enhancement unit 73 executes the saturation enhancement processing on the pixel data such that a ratio of a difference between the signal levels of the R signal and the B signal to a difference between the signal levels of the G signal and the B signal does not change (such that the hue H expressed in expression (2) does not change) (step S12C).

More specifically, in the example illustrated in FIG. 6, the saturation enhancement unit 73 executes the saturation enhancement processing on the pixel data until the signal level of the R signal reaches the saturation level while keeping unchanged the ratio of the difference between the signal levels of the R signal and the B signal to the difference between the signal levels of the G signal and the B signal.

Note that the saturation enhancement processing may be adapted to perform processing such that not only the highest signal level among the R, G, and B signals reaches the saturation level but also the signal level reaches a level set according to an operation by the camera user on the operating unit 5, for example.

Following step S12C, the composite image generation unit 74 calculates saturation of the pixel not excluded in step S12B among the pixels at the target pixel position, on the basis of the pixel data of the pixel (step S12D).

Here, saturation S can be calculated by the following expression (5) in the HSV color space, for example.

$$\text{Saturation } S=(\text{Max}(RGB)-\text{Min}(RGB))/\text{Max}(RGB) \quad (5)$$

Following step S12D, the composite image generation unit 74 compares the saturation calculated in step S12D and selects a pixel with the highest saturation among the pixels at the target pixel position (step S12E).

Following step S12E, the composite image generation unit 74 determines whether or not the pixel with the highest saturation is selected at all pixel positions in the plurality of HDR image data stored in the memory unit 3 (whether or not the selection is performed at all the pixel positions) (step S12F).

When it is determined that the selection is not performed at all the pixel positions (step S12F: No), the control unit 7 switches the target pixel position to another pixel position (step S12G) and returns to step S12A.

When it is determined that the selection is performed at all the pixel positions as a result of repeating steps S12A to S12G (step S12F: Yes), the composite image generation unit 74 adopts each pixel selected in step S12E as the pixel at each pixel position (composites the selected pixel) and executes composition processing that generates the composite image data (step S12H: a composite image generation step).

Figure 7:
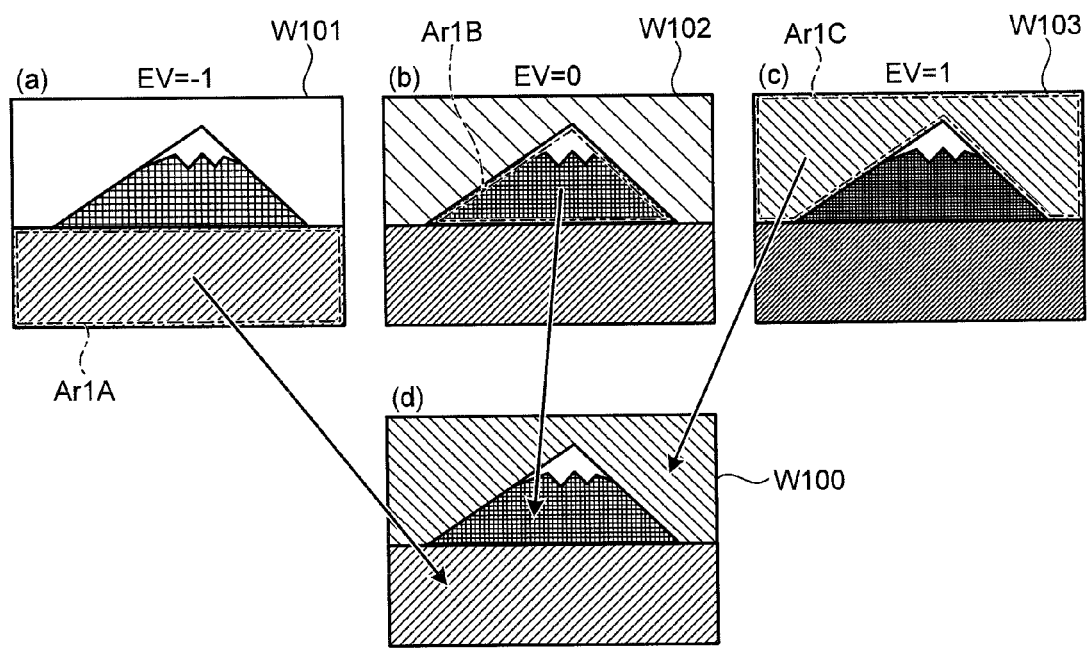
FIG. 7 is a diagram illustrating step S12H illustrated in FIG. 4.

FIG. 7 is a diagram illustrating step S12H. Specifically, FIG. 7 illustrates a case where the number of images shot calculated in step S8 equals "three images" and a "mountain" being the same subject is shot three times. FIG. 7(a) illustrates an HDR image W101 that is shot with the exposure value (EV)=−1 and corresponds to the HDR image data after the saturation enhancement processing (step S12C) is executed. FIG. 7(b) illustrates an HDR image W102 that is shot with the exposure value (EV)=0 and corresponds to the HDR image data after the saturation enhancement processing is executed. FIG. 7(c) illustrates an HDR image W103 that is shot with the exposure value (EV)=1 and corresponds to the HDR image data after the saturation enhancement processing is executed. FIG. 7(d) illustrates a composite image W100 (composite image data) generated on the basis of the HDR images W101 to W103.

In the example illustrated in FIG. 7, the HDR image W101 has clipped whites in an area corresponding to "sky" that is in the background of the "mountain" since the exposure value (EV) is low. The HDR image W103 has crushed blacks in an area corresponding to "trees" positioned in front of the "mountain" since the exposure value (EV) is high.

In the example illustrated in FIG. 7, each pixel in an area Ar1A of the HDR image W101, each pixel in an area Ar1B of the HDR image W102, and each pixel in an area Ar1C of the HDR image W103 are selected as pixels having the highest saturation as a result of the comparison performed in step S12E among the corresponding pixels in the HDR images W101 to W103. Accordingly, in step S12H, the composite image generation unit 74 adopts each pixel in each of the areas Ar1A to Ar1C as the pixel at each pixel position and generates the composite image W100, as illustrated in FIG. 7(d).

Following step S12H, the display control unit 75 causes the display unit 6 to display a composite image (the composite image W100 in the example illustrated in FIG. 7) corresponding to the composite image data generated in step S12H (step S12I). The imaging apparatus 1 thereafter returns to the main routine illustrated in FIG. 2.

The imaging apparatus 1 according to the aforementioned first embodiment acquires the plurality of HDR image data by imaging the same subject (step S10), executes the saturation enhancement processing on each of the plurality of HDR image data (step S12C) and, following the saturation enhancement processing, executes the composition processing to generate the composite image data (step S12H).

As a result, the vivid composite image data with enhanced saturation can be generated. Therefore, according to the imaging apparatus 1 of the first embodiment, the composite image data that highly meets the taste of the camera user can be generated.

The imaging apparatus 1 of the first embodiment also executes the saturation enhancement processing while keeping the hue of the pixel unchanged (step S12C).

As a result, there can be generated the vivid composite image data, the saturation of which is enhanced naturally without any sense of incongruity.

The imaging apparatus 1 of the first embodiment also excludes the saturated pixel and noise pixel in the saturation enhancement processing (step S12C) and the composition processing (step S12H).

Therefore, the composite image data that is natural without any loss in gradation such as the clipped whites, washed-out color, crushed blacks or color saturation can be generated.

Variation of First Embodiment

While the saturation enhancement unit 73 in the first embodiment executes the saturation enhancement processing that enhances the saturation of "each pixel" for each of the plurality of HDR image data, the saturation enhancement unit may also be configured to execute saturation enhancement processing that enhances the saturation of "at least a part of an entire image area" for each of the plurality of HDR image data. That is, the saturation enhancement processing need not be executed for every pixel in all pixels but may be executed on each area of a plurality of areas into which the entire image area is divided or only on a part of the entire image area. Likewise, the composition processing need not perform comparison for each pixel but may be configured to compare corresponding areas in the plurality of HDR image data, select an area with the highest saturation, and generate the composite image data formed of the selected area.

Second Embodiment

A second embodiment of the present invention will now be described.

In the following description, a configuration and a step similar to that of the first embodiment will be assigned the same reference numerals as that of the first embodiment and will not be described in detail or will be described simply.

In the "vivid composition mode" according to the first embodiment, the plurality of HDR image data acquired by continuously shooting the same subject while changing the exposure value (EV) is composited. This composition method will be hereinafter referred to as an "HDR composition method".

On the other hand, composited in a "vivid composition mode" according to the second embodiment is a plurality of image data acquired by imaging the same subject with the same exposure value (EV) for a plurality of times at a predetermined time interval. This composition method will be hereinafter referred to as a "same/continuous exposure composition method".

An imaging apparatus according to the second embodiment has a configuration similar to that of the imaging apparatus 1 (FIG. 1) described in the first embodiment.

An operation of an imaging apparatus 1 according to the second embodiment will be described below.
Operation of Imaging Apparatus FIG. 8 is a flowchart illustrating the operation of the imaging apparatus 1 according to the second embodiment of the present invention.

Figure 8:
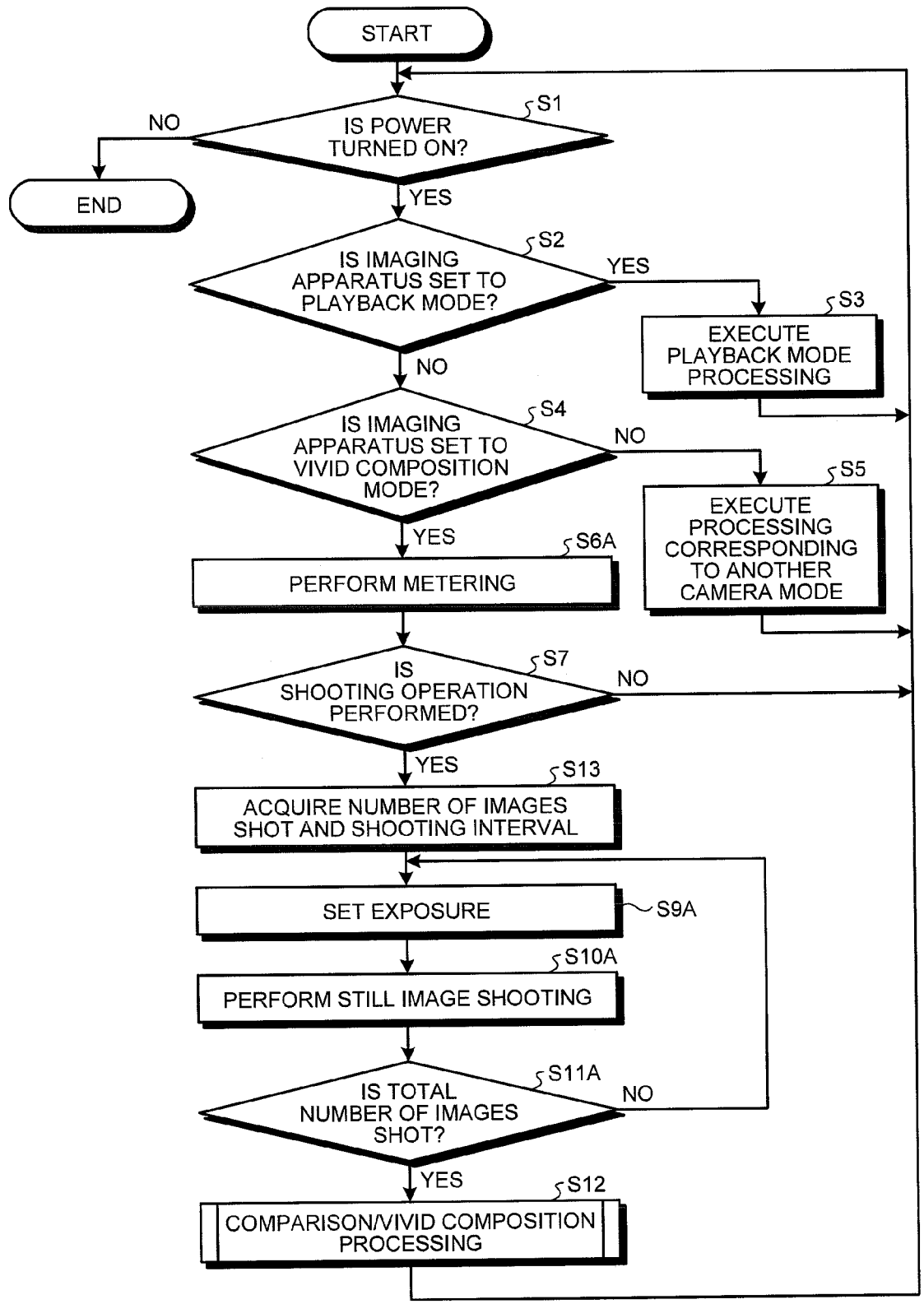
FIG. 8 is a flowchart illustrating an operation of an imaging apparatus according to a second embodiment of the present invention.

The operation of the imaging apparatus 1 according to the second embodiment is different from the operation described in the first embodiment (FIGS. 2 and 4) in that, as illustrated in FIG. 8, steps S6A, S13, and S9A to S11A are adopted instead of steps S6 and S8 to S11. Therefore, only steps S6A, S13, and S9A to S11A will be described below.

Step S6A is executed when it is determined in step S4 that the imaging apparatus 1 is set to the "vivid composition mode" (step S4: Yes).

Specifically, an exposure setting unit 71 in step S6A causes an imaging unit 2 to perform imaging and sets a proper exposure value (EV) when employing the "same/continuous exposure composition method" to perform imaging a plurality of times on the basis of live view image data acquired by the imaging (such setting will be hereinafter referred to as metering).

The proper exposure can be set by using known center-weighted metering, spot metering or multi-zone metering algorithm.

Step S13 is executed when it is determined in step S7 that a shooting operation is performed (step S7: Yes).

Specifically, an imaging control unit 72 in step S13 acquires the number of images shot and a shooting interval that are set in advance according to an operation by a camera user on an operating unit 5 and stored in a memory unit 3.

Following step S13, the imaging control unit 72 operates a drive unit 24 and sets the exposure value (EV) to the proper exposure set in step S6A (step S9A).

Following step S9A, the imaging control unit 72 causes the imaging unit 2 to image (shoot a still image of) a subject (step S10A: an image acquisition step). The imaging control unit 72 thereafter stores, into the memory unit 3, HDR image data acquired by the imaging.

Following step S10A, the imaging control unit 72 determines whether or not the imaging unit 2 is done imaging the number of images of the subject (done shooting the total number of images), the number of images being acquired in step S13 (step S11A).

The imaging apparatus 1 returns to step S9A when it is determined that the total number of images is not shot yet (step S11A: No). Then, when time corresponding to the shooting interval acquired in step S13 elapses, the imaging apparatus 1 in step S10A causes the imaging unit 2 to image the subject again with the proper exposure set in step S9A.

When it is determined that shooting of the total number of images is completed as a result of repeating steps S9A to S11A (step S11A: Yes), the imaging apparatus 1 proceeds to comparison/vivid composition processing (step S12).

Note that the comparison/vivid composition processing according to the second embodiment is similar to the comparison/vivid composition processing (step S12) described in the first embodiment. Step S12H will mainly be described with reference to FIG. 9.

Figure 9:
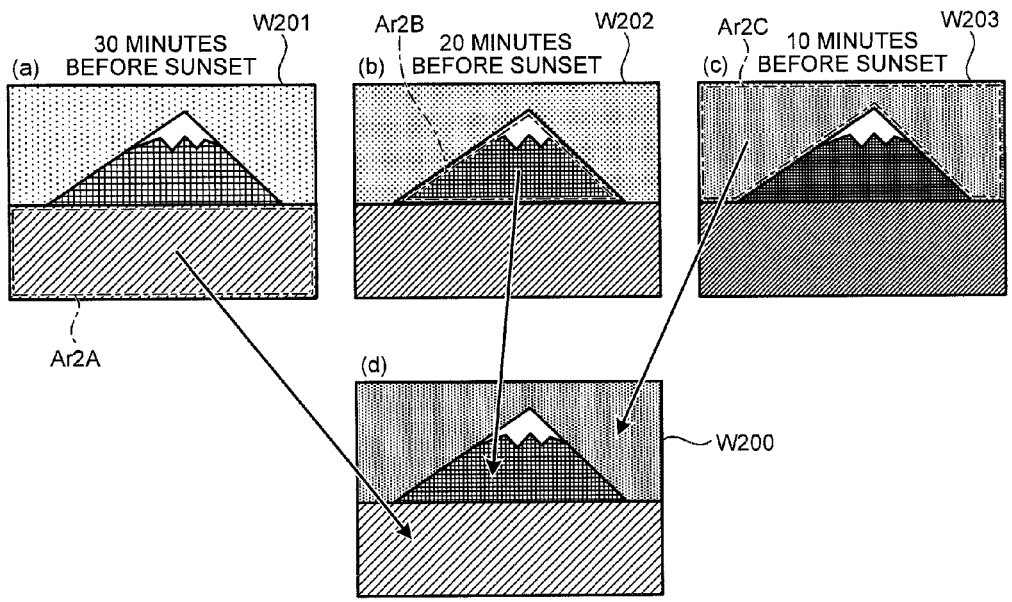
FIG. 9 is a diagram illustrating step S12H according to the second embodiment of the present invention.

FIG. 9 is a diagram illustrating step S12H according to the second embodiment. Specifically, FIG. 9 illustrates a case where the number of images shot and the shooting interval acquired in step S13 are "three images" and "10 minutes", respectively, and a "mountain" being the same subject starts to be shot 30 minutes before sunset and is then shot twice (three times total) at a 10-minute interval. Note that the exposure value (EV) at the time of the shooting is the same. FIG. 9(a) illustrates an HDR image W201 that is shot 30 minutes before sunset and corresponds to HDR image data after the saturation enhancement processing (step S12C) is executed. FIG. 9(b) illustrates an HDR image W202 that is shot 20 minutes before sunset and corresponds to the HDR image data after the saturation enhancement processing is executed. FIG. 9(c) illustrates an HDR image W203 that is shot 10 minutes before sunset and corresponds to the HDR image data after the saturation enhancement processing is executed. FIG. 9(d) illustrates a composite image W200 (composite image data) generated on the basis of the HDR images W201 to W203.

In the example illustrated in FIG. 9, each pixel in an area Ar2A of the HDR image W201, each pixel in an area Ar2B of the HDR image W202, and each pixel in an area Ar2C of the HDR image W203 are selected as pixels having the highest saturation as a result of the comparison performed in step S12E among the corresponding pixels in the HDR images W201 to W203. Accordingly, in step S12H, a composite image generation unit 74 adopts each pixel in each of the areas Ar2A to Ar2C as the pixel at each pixel position and generates the composite image W200 as illustrated in FIG. 9(d).

An effect similar to that of the first embodiment can be obtained when the "same/continuous exposure composition method" is adopted as described in the second embodiment.

Variation of Second Embodiment

While the second embodiment is adapted to perform the first shooting immediately after the shooting operation is performed (step S7: Yes), it may also be configured to perform the first shooting at a shooting time (at sunrise or sunset, for example) that is preset according to an operation by a camera user on an operating unit 5 and stored in a memory unit 3, for example.

Moreover, while the saturation enhancement unit 73 in the second embodiment executes the saturation enhancement processing that enhances the saturation of "each pixel" for each of the plurality of HDR image data, the saturation enhancement unit may also be configured to execute saturation enhancement processing that enhances the saturation of "at least a part of an entire image area" for each of the plurality of HDR image data. That is, the saturation enhancement processing need not be executed for every pixel in all pixels but may be executed on each area of a plurality of areas into which the entire image area is divided or only on a part of the entire image area. Likewise, the composition processing need not perform comparison for each pixel but may be configured to compare corresponding areas in the plurality of HDR image data, select an area with the highest saturation, and generate the composite image data formed of the selected area.

Third Embodiment

A third embodiment of the present invention will now be described.

In the following description, a configuration and a step similar to that of the first and second embodiments will be assigned the same reference numerals as that of the first and second embodiments and will not be described in detail or will be described simply.

An imaging apparatus according to the third embodiment adopts a "scene determination/vivid composition mode" instead of the "vivid composition mode" adopted for the imaging apparatus 1 described in the first embodiment.

The imaging apparatus according to the third embodiment as well as an operation of the imaging apparatus will be described below.

Configuration of Imaging Apparatus

Figure 10:
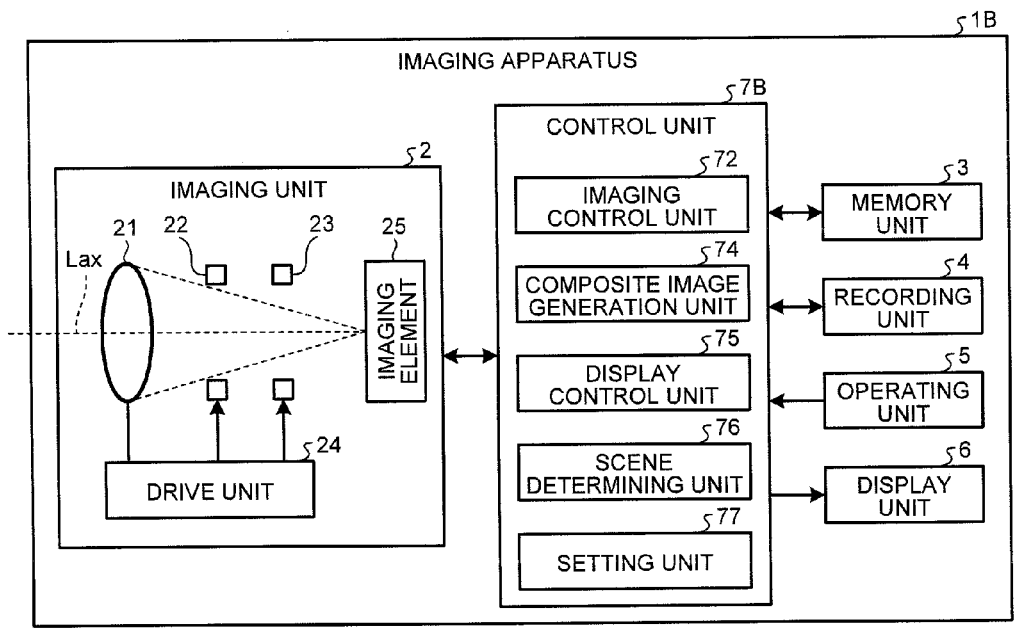
FIG. 10 is a block diagram illustrating a configuration of an imaging apparatus according to a third embodiment of the present invention.

FIG. 10 is a block diagram illustrating a configuration of an imaging apparatus 1B according to the third embodiment of the present invention.

The imaging apparatus 1B of the third embodiment is different from the imaging apparatus 1 (FIG. 1) described in the first embodiment in that a part of the function of the control unit 7 is modified.

As illustrated in FIG. 10, a control unit 7B of the third embodiment additionally includes a scene determining unit 76 and a setting unit 77 but does not include the exposure setting unit 71 and the saturation enhancement unit 73 that are included in the control unit 7 described in the first embodiment.

The scene determining unit 76 analyzes (determines) a scene at the time of shooting on the basis of live view image data imaged by an imaging unit 2. The scene determining unit 76 for example determines a scene such as a landscape (trees), a night scene, the setting sun, a beach, snow, and the starry sky on the basis of a distribution of a color component of pixel data (R signal, B signal, and first and second G signals) of each pixel included in the live view image data.

The setting unit 77 has the following function in addition to a function (function of setting the range of the exposure value (EV) when imaging is performed a plurality of times by HDR metering adopting the "HDR composition method") similar to that of the exposure setting unit 71 described in the first embodiment.

That is, the setting unit 77 has a function (function of setting a proper exposure (EV) when imaging is performed a plurality of times by employing a "same/continuous exposure composition method" on the basis of live view image data acquired by HDR metering) similar to that of the exposure setting unit 71 described in the second embodiment. Moreover, the setting unit 77 has a function of setting a "base hue", a "composition method", and "the number of images shot" according to the scene determined by the scene determining unit 76.

Operation of Imaging Apparatus

Figure 11:
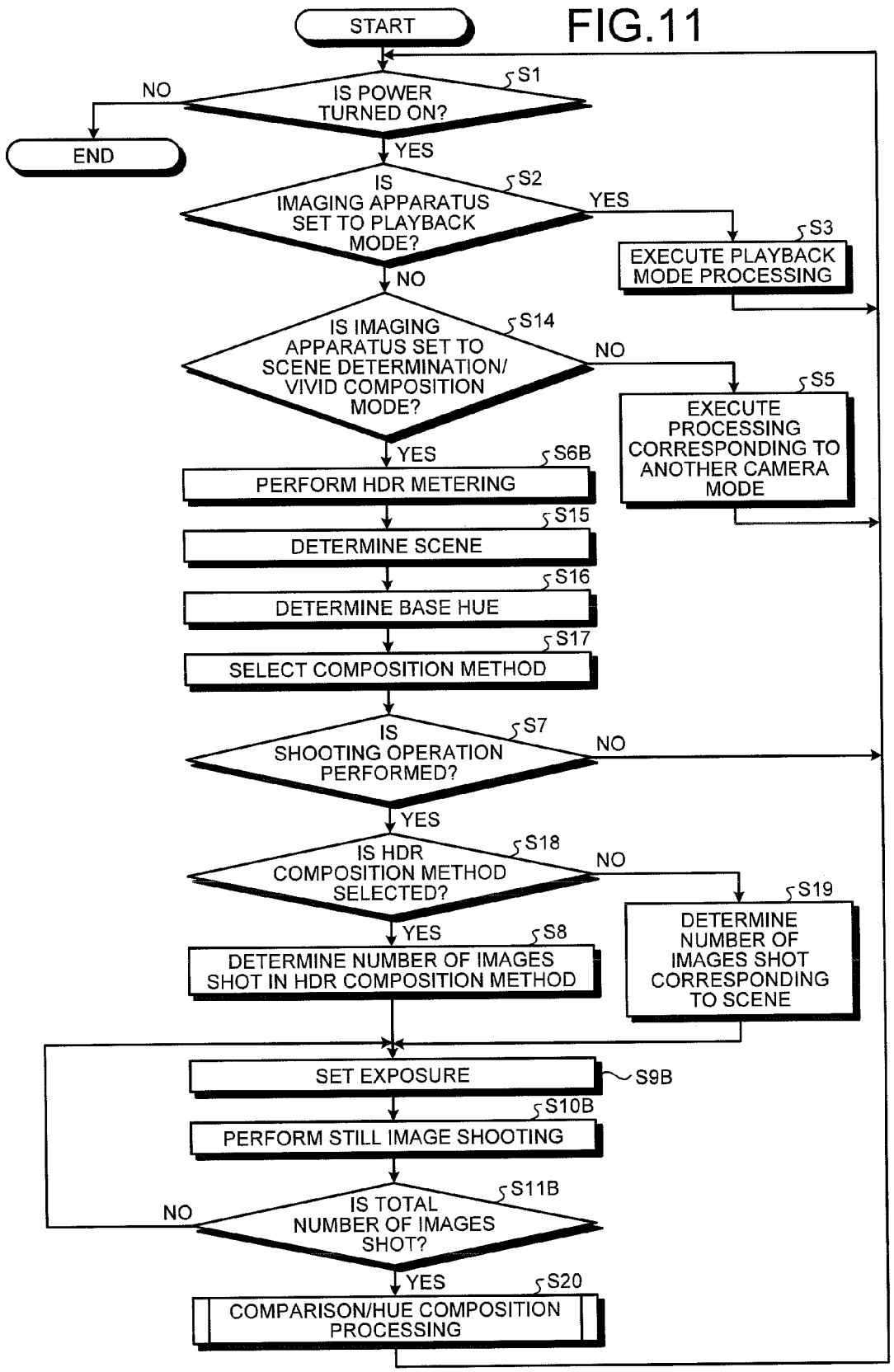
FIG. 11 is a flowchart illustrating an operation of the imaging apparatus illustrated in FIG. 10.

FIG. 11 is a flowchart illustrating the operation of the imaging apparatus 1B.

The operation of the imaging apparatus 1B according to the third embodiment is different from the operation of the imaging apparatus 1 described in the first embodiment (FIGS. 2 and 4) in that steps S14, S6B, S9B to SUB, and S20 are adopted instead of steps S4, S6 and S9 to S12 and that steps S15 to S19 are added. Therefore, only steps S14, S6B, S15 to S19, S9B to SUB, and S20 will be described below.

Step S14 is executed when it is determined in step S2 that the imaging apparatus 1B is not set to a "playback mode" (step S2: No).

Specifically, the control unit 7B in step S14 determines whether or not the imaging apparatus 1B is set to the "scene determination/vivid composition mode".

The control unit 7B proceeds to step S5 when it is determined that the imaging apparatus 1B is not set to the "scene determination/vivid composition mode" (step S14: No).

When it is determined that the imaging apparatus 1B is set to the "scene determination/vivid composition mode" (step S14: Yes), on the other hand, the setting unit 77 employs HDR metering to set the range of the exposure value (EV) when performing imaging a plurality of times by the "HDR composition method" as well as the proper exposure (EV) when performing imaging a plurality of times by the "same/continuous exposure composition method" (step S6B).

Following step S6B, the scene determining unit 76 analyzes (determines) a scene at the time of shooting on the basis of live view image data acquired by HDR metering performed in step S6B (step S15: a scene determination step).

The setting unit 77 after step S15 refers to association information recorded in a recording unit 4 to determine the "base hue" corresponding to the scene determined in step S15 (step S16: a setting step) as well as selects the "composition method" corresponding to the scene (step S17). The imaging apparatus 1B thereafter proceeds to step S7.

FIG. 12 is a table illustrating an example of the association information.

As illustrated in FIG. 12, the association information in this case refers to information in which the "base hue", "composition method", and "the number of images shot" are associated with each scene determined by the scene determining unit 76.

Specifically, for example, green (120°) as the "base hue" and the HDR composition method as the "composition method" are associated with a scene "landscape (trees)". Associated with a scene "night scene" are yellow (80°) as the "base hue", the same/continuous exposure composition method as the "composition method", and "0 images" as "the number of images shot". The number of images shot is associated only when the composition method is the "same/continuous exposure composition method".

Step S18 is executed when it is determined in step S7 that a shooting operation is performed (step S7: Yes).

Specifically, the control unit 7B in step S18 determines whether or not the composition method selected in step S17 is the "HDR composition method".

The imaging apparatus 1B proceeds to step S8 when it is determined that the composition method is the "HDR composition method" (step S18: Yes).

On the other hand, when it is determined that the composition method is not the "HDR composition method" (but the "same/continuous exposure composition method") (step S18: No), the setting unit 77 refers to the association information recorded in the recording unit 4 to determine "the number of images shot" corresponding to the scene determined in step S15 (step S19).

Steps S9B to S11B are executed after step S8 or S19.

Specifically, an imaging control unit 72 in steps S9B to S11B executes the processing similar to that in steps S9 to S11 described in the first embodiment when the composition method selected in step S17 is the "HDR composition method". Moreover, the imaging control unit 72 in steps S9B to S11B executes the processing similar to that in steps S9A to S11A described in the second embodiment when the composition method selected in step S17 is the "same/continuous exposure composition method".

Step S20 (comparison/hue composition processing) is executed when it is determined in step S11B that the total number of images is shot (the total number corresponding to the number of images shot calculated in step S8 when the composition method is the "HDR composition method, or the number of images shot calculated in step S19 when the composition method is the "same/continuous exposure composition method") (step S11B: Yes).

Comparison/Hue Composition Processing

Figure 13:
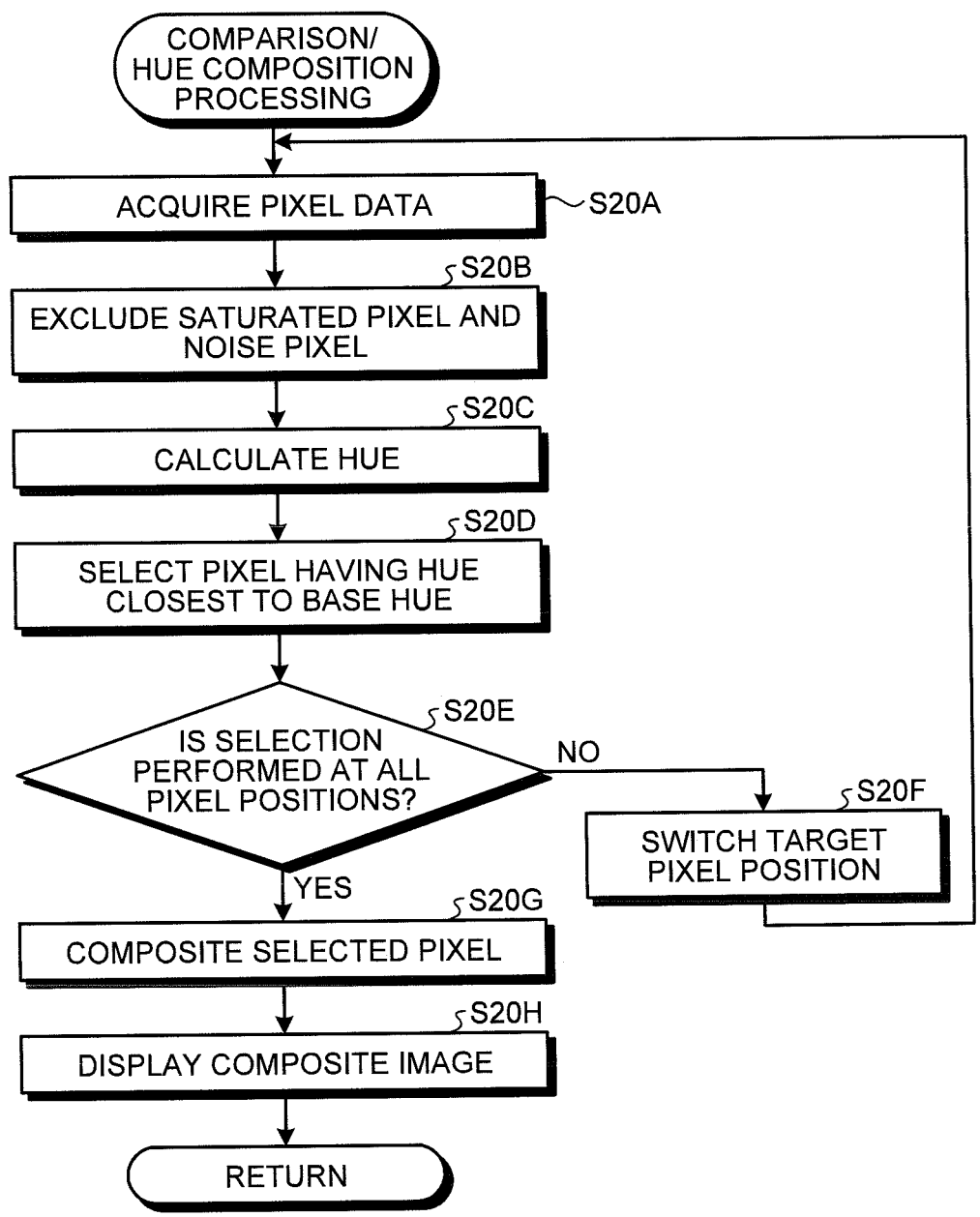
FIG. 13 is a flowchart illustrating comparison/hue composition processing (step S20) illustrated in FIG. 11.

FIG. 13 is a flowchart illustrating the comparison/hue composition processing (step S20).

Similar to steps S12A and S12B described in the first embodiment, a composite image generation unit 74 first acquires pixel data of each pixel at a target pixel position in a plurality of HDR image data stored in a memory unit 3 (step S20A) and excludes a saturated pixel and a noise pixel (step S20B).

Following step S20B, the composite image generation unit 74 uses expressions (2) to (4) or the like and calculates the hue of a pixel not excluded in step S20B among the pixels at the target pixel position, on the basis of the pixel data of the pixel (step S20C).

Following step S200, the composite image generation unit 74 compares the hue of each pixel calculated in step S200 with the "base hue" determined in step S16, and selects a pixel having the hue closest to the "base hue" from among the pixels at the target pixel position (step S20D).

Following step S20D, the composite image generation unit 74 determines whether or not the pixel having the hue closest to the "base hue" is selected at all pixel positions in the plurality of HDR image data stored in the memory unit 3 (whether or not the selection is performed at all the pixel positions) (step S20E).

The control unit 7B switches the target pixel position to another pixel position (step S20F) and returns to step S20A when it is determined that the selection is not performed at all the pixel positions (step S20E: No).

When it is determined that the selection is performed at all the pixel positions as a result of repeating steps S20A to S20F (step S20E: Yes), the composite image generation unit 74 adopts each pixel selected in step S20D as the pixel at each pixel position (composites the selected pixel) and executes composition processing that generates composite image data (step S20G: a composite image generation step).

Following step S20G, a display control unit 75 causes a display unit 6 to display a composite image corresponding to the composite image data generated in step S20G (step S20H). The imaging apparatus 1B thereafter returns to the main routine illustrated in FIG. 11.

The imaging apparatus 1B according to the third embodiment can generate the composite image data with the base hue corresponding to the scene at the time of shooting, whereby the effect similar to that of the first embodiment can be realized.

Variation of Third Embodiment

In the third embodiment, the composite image generation unit 74 compares the corresponding "pixels" in the plurality of HDR image data to select the "pixel" having the hue closest to the base hue and execute the composition processing that generates the composite image data formed of the selected "pixel". However, the composite image generation unit need not perform comparison for each pixel but may be configured to compare corresponding "areas" in the plurality of HDR image data, select an "area" with a hue closest to the base hue, and execute the composition processing that generates the composite image data formed of the selected "area".

Fourth Embodiment

A fourth embodiment of the present invention will now be described.

In the following description, a configuration and a step similar to that of the first embodiment will be assigned the same reference numerals as that of the first embodiment and will not be described in detail or will be described simply.

An imaging apparatus according to the fourth embodiment performs processing in a "vivid composition mode" differently from the imaging apparatus 1 described in the first embodiment.

The imaging apparatus according to the fourth embodiment as well as an operation of the imaging apparatus will be described below.

Configuration of Imaging Apparatus

Figure 14:
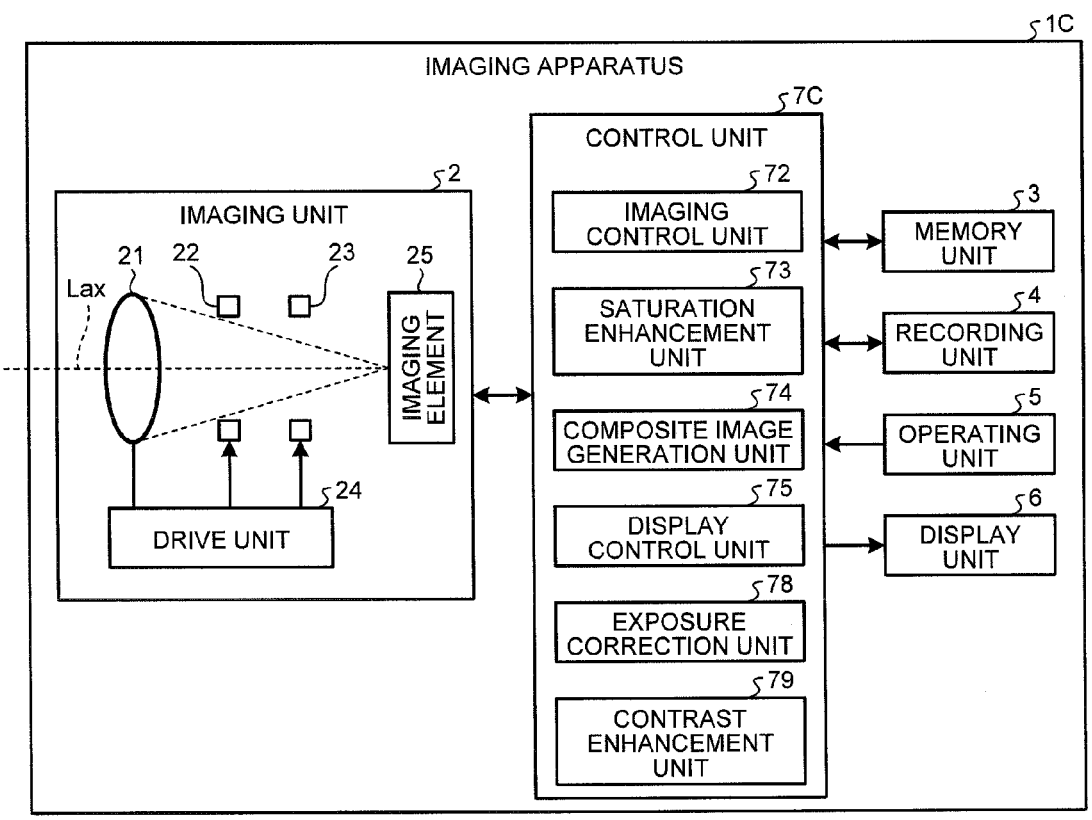
FIG. 14 is a block diagram illustrating a configuration of an imaging apparatus according to a fourth embodiment of the present invention.

FIG. 14 is a block diagram illustrating a configuration of an imaging apparatus 1C according to the fourth embodiment of the present invention.

The imaging apparatus 1C of the fourth embodiment is different from the imaging apparatus 1 (FIG. 1) described in the first embodiment in that a part of the function of the control unit 7 is modified.

As illustrated in FIG. 14, compared to the control unit 7 described in the first embodiment, a control unit 7C of the fourth embodiment additionally includes an exposure correction unit 78 and a contrast enhancement unit 79 but does not include the exposure setting unit 71 included in the control unit 7.

The exposure correction unit 78 performs exposure correction (brightness correction) on pixel data after saturation enhancement processing is executed thereon.

The contrast enhancement unit 79 executes contrast enhancement processing on image data after the exposure correction is performed thereon by the exposure correction unit 78. Note that a known histogram equalization method can be employed as the contrast enhancement processing, for example.

Operation of Imaging Apparatus

Figure 15:
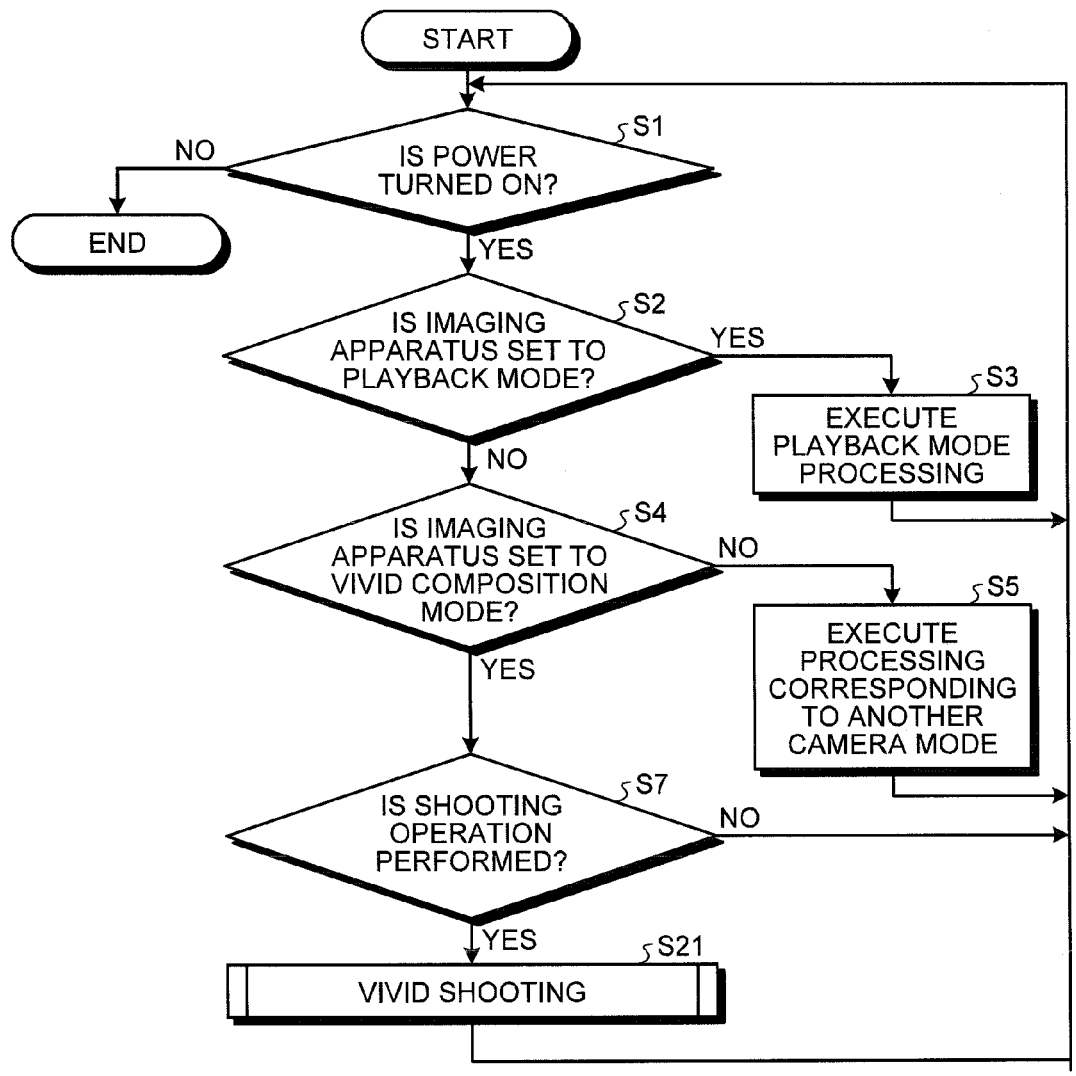
FIG. 15 is a flowchart illustrating an operation of the imaging apparatus illustrated in FIG. 14.

FIG. 15 is a flowchart illustrating the operation of the imaging apparatus 10.

The operation of the imaging apparatus 10 according to the fourth embodiment is different from the operation described in the first embodiment (FIG. 2) in that, as illustrated in FIG. 15, step S6 is omitted while at the same time step S21 is adopted instead of steps S8 to S12. Therefore, only step S21 will be described below.

Step S6 being omitted from the operation of the imaging apparatus 10, the imaging apparatus 10 proceeds to step S7 when it is determined in step S4 that the imaging apparatus 10 is set to a "vivid composition mode" (step S4: Yes).

The imaging apparatus 10 then proceeds to step S21 (vivid shooting) when it is determined in step S7 that a shooting operation is performed (step S7: Yes).

Vivid Shooting

Figure 16:
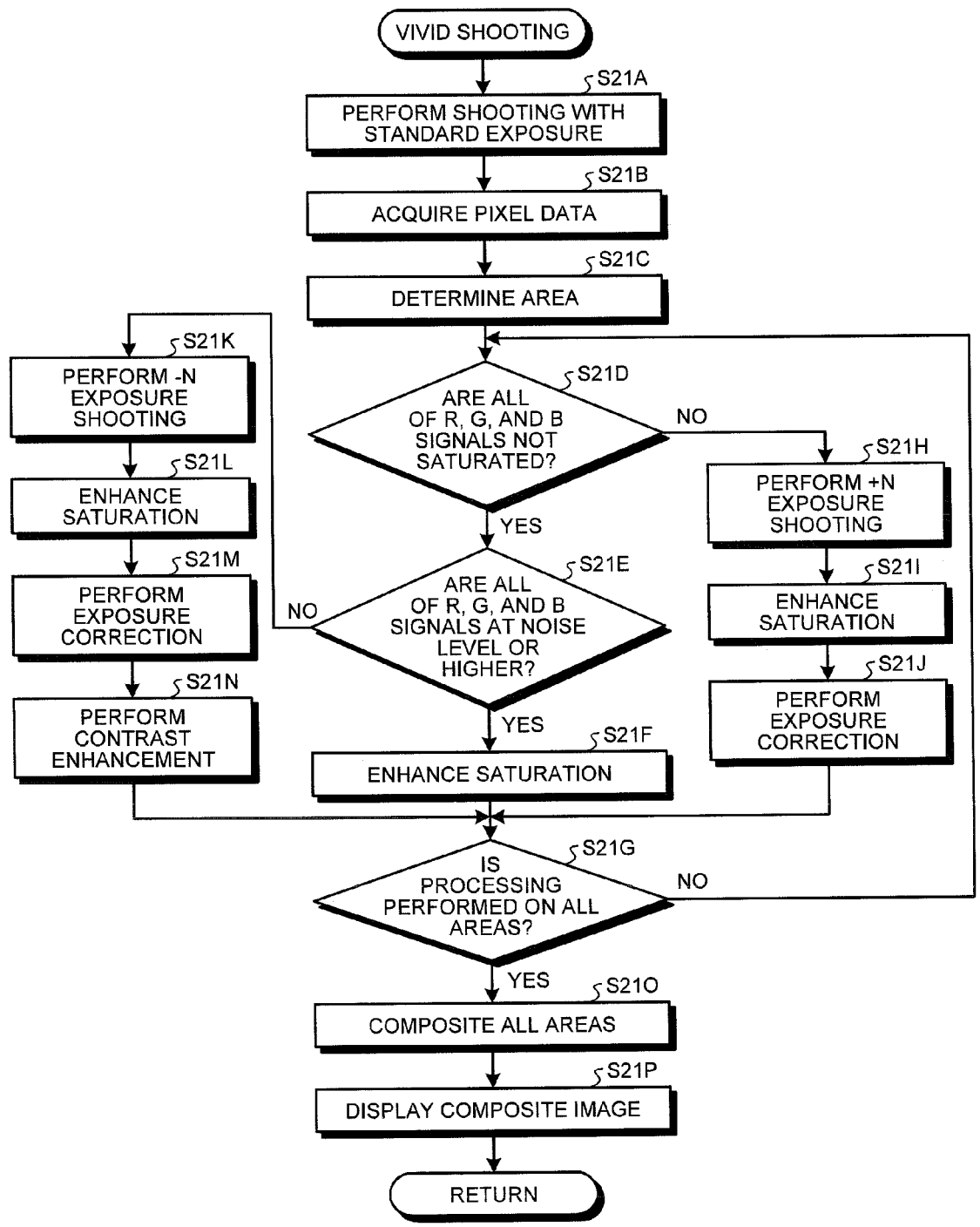
FIG. 16 is a flowchart illustrating vivid shooting (step S21) illustrated in FIG. 15.

FIG. 16 is a flowchart illustrating the vivid shooting (step S21).

First, an imaging control unit 72 operates a drive unit 24 to set an exposure value (EV) to a standard exposure (EV=0), and at the same time causes an imaging unit 2 to image (shoot a still image of) a subject with the standard exposure (step S21A). The imaging control unit 72 then stores image data (hereinafter referred to as standard exposure image data) acquired by the imaging into a memory unit 3.

Figure 17:
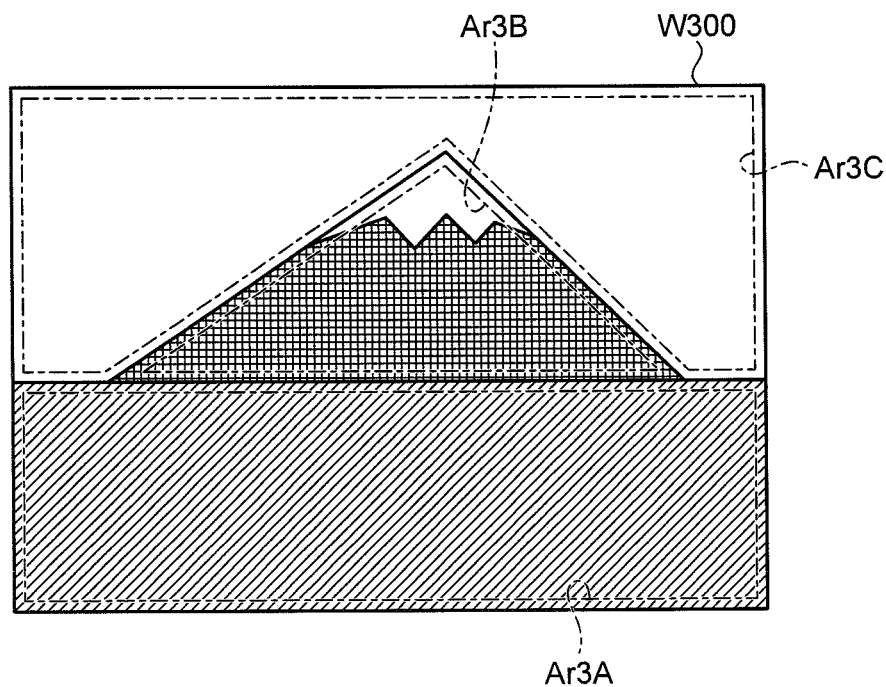
FIG. 17 is a diagram illustrating an example of a standard exposure image corresponding to standard exposure image data that is shot with standard exposure in step S21A illustrated in FIG. 16.

FIG. 17 is a diagram illustrating an example of a standard exposure image W300 corresponding to the standard exposure image data that is shot with the standard exposure in step S21A. Specifically, FIG. 17 illustrates a case where a "mountain" is shot as the subject.

In the example illustrated in FIG. 17, the standard exposure image W300 has crushed blacks in an area Ar3A corresponding to "trees" positioned in front of the "mountain". That is, the area Ar3A is an area formed of a noise pixel. The standard exposure image W300 also has clipped whites in an area Ar3C corresponding to the "sky" in the background of the "mountain". That is, the area Ar3C is an area formed of a saturated pixel. An area Ar3B corresponding to the "mountain" does not have crushed blacks or clipped whites in the standard exposure image W300.

Following step S21A, a saturation enhancement unit 73 acquires pixel data of each pixel from the standard exposure image data stored in the memory unit 3 (step S21B).

The saturation enhancement unit 73 after step S21B determines an entire area of the standard exposure image (the standard exposure image W300 in the example illustrated in FIG. 17) corresponding to the standard exposure image data stored in the memory unit 3 (step S21C).

Specifically, the saturation enhancement unit 73 in step S21C specifies a saturated pixel and a noise pixel, as with step S12B described in the first embodiment, on the basis of the pixel data of each pixel acquired in step S21B. The saturation enhancement unit 73 then divides the entire area of the standard exposure image (the standard exposure image W300 in the example illustrated in FIG. 17) corresponding to the standard exposure image data stored in the memory unit 3 into a saturated area (the area Ar3C in the example illustrated in FIG. 17) formed of the saturated pixel, a noise area (the area Ar3A in the example illustrated in FIG. 17) formed of the noise pixel, and a normal area (the area Ar3B in the example illustrated in FIG. 17) formed of neither the saturated pixel nor the noise pixel but a normal pixel.

Similar to step S12C described in the first embodiment, the saturation enhancement unit 73 executes saturation enhancement processing (step S21F) on the pixel data of each pixel in the normal area (the area Ar3B in the example illustrated in FIG. 17) that is determined to not be formed of the saturated pixel or the noise pixel as the result of determination made in step S21C (step S21D: Yes, step S21E: Yes).

Here, not changing the hue of the pixel data means that a balance of color components such as R, G and B is not changed, and enhancing the saturation means that each color component is amplified. However, if there is a well-known attractive color such as rouge or vermilion and the hue close to the attractive color is detected or if a preferred color is set in advance, an amplification rate of each color component may be finely adjusted to make a color closer to the attractive color or the preferred color. Therefore, the balance of the color components may be slightly changed, but the color components must not be saturated.

Following step S21F, the saturation enhancement unit 73 determines whether or not the saturation enhancement processing is performed on all the areas (the areas Ar3A to Ar3C in the example illustrated in FIG. 17) (step S21G).

The imaging apparatus 1C returns to step S21D when it is determined that the processing is not performed on all the areas (step S21G: No).

The imaging control unit 72 executes +N exposure shooting (step S21H) when there exists the saturated area (the area Ar3C in the example illustrated in FIG. 17) determined to be formed of the saturated pixel (step S21D: No) as the result of determination made in step S21C.

Specifically, the imaging control unit 72 in step S21H operates the drive unit 24 to set the exposure value (EV) to an exposure value (EV=+N) higher than the standard exposure (EV=0), and at the same time causes the imaging unit 2 to image (perform still image shooting of) the subject (identical to the subject shot in step S21A) with the exposure value (EV=+N). The imaging control unit 72 then stores image data (hereinafter referred to as +N level image data) acquired by the imaging into the memory unit 3.

Following step S21H, the saturation enhancement unit 73 acquires pixel data of each pixel in an area (hereinafter referred to as a saturation equivalent area) equivalent to the saturated area (the area Ar3C in the example illustrated in FIG. 17) in the standard exposure image data, from the +N level image data stored in the memory unit 3. The saturation enhancement unit 73 then executes the saturation enhancement processing as in step S21F against the pixel data of each pixel in the saturation equivalent area (step S21I).

Following step S21I, in order to match the brightness between the pixel data of each pixel in the saturation equivalent area and the standard exposure image, the exposure correction unit 78 performs exposure correction (correction to increase brightness) on the pixel data after the saturation enhancement processing is executed thereon in step S21I (step S21J). The imaging apparatus 10 thereafter proceeds to step S21G.

The imaging control unit 72 executes −N exposure shooting (step S21K) when there exists the noise area (the area Ar3A in the example illustrated in FIG. 17) determined to be formed of the noise pixel (step S21E: No) as the result of determination made in step S21C.

Specifically, the imaging control unit 72 in step S21K operates the drive unit 24 to set the exposure value (EV) to an exposure value (EV=−N) lower than the standard exposure (EV=0), and at the same time causes the imaging unit 2 to image (perform still image shooting of) the subject (identical to the subject shot in step S21A) with the exposure value (EV=−N). The imaging control unit 72 then stores image data (hereinafter referred to as −N level image data) acquired by the imaging into the memory unit 3.

Following step S21K, the saturation enhancement unit 73 acquires pixel data of each pixel in an area (hereinafter referred to as a noise equivalent area) equivalent to the noise area (the area Ar3A in the example illustrated in FIG. 17) in the standard exposure image data, from the −N level image data stored in the memory unit 3. The saturation enhancement unit 73 then executes the saturation enhancement processing as in step S21F against the pixel data of each pixel in the noise equivalent area (step S21L).

Following step S21L, in order to match the brightness between the pixel data of each pixel in the noise equivalent area and the standard exposure image, the exposure correction unit 78 performs exposure correction (correction to decrease brightness) on the pixel data after the saturation enhancement processing is executed thereon in step S21L (step S21M).

The contrast enhancement unit 79 after step S21M executes the contrast enhancement processing on the noise equivalent area after the exposure correction is executed thereon in step S21M (step S21N). The imaging apparatus 10 thereafter proceeds to step S21G.

When it is determined that the processing is performed on all the areas after step S21F, S21J or S21N (step S21G: Yes), a composite image generation unit 74 generates composite image data by compositing (combining) the normal area (the area Ar3B in the example illustrated in FIG. 17) after the saturation enhancement processing is executed thereon in step S21F, the saturation equivalent area after the exposure correction is executed thereon in step S21J, and the noise equivalent area after the contrast enhancement processing is executed thereon in step S21N (step S21O).

Following step S21O, a display control unit 75 causes a display unit 6 to display a composite image corresponding to the composite image data generated in step S21O (step S21P). The imaging apparatus 1C thereafter returns to the main routine illustrated in FIG. 15.

Note that steps S21H to S21J and S21K to S21N are not performed when it is determined as a result of the determination in step S21C that all the pixels in the standard exposure image data are normal pixels. Therefore, step S21O is not executed, either. In step S21P, the display unit 6 displays the image corresponding to the image data obtained after the saturation enhancement processing is executed on the pixel data of all the pixels in the standard exposure image data in step S21F.

Moreover, steps S21F, S21H to S21J, or S21K to S21N are not performed when it is determined as a result of the determination in step S21C that the standard exposure image data does not include the normal area, the saturated area or the noise area. In this case, in step S21O, composite image data is generated by compositing two of the normal area after the saturation enhancement processing is executed thereon in step S21F, the saturation equivalent area after the exposure correction is executed thereon in step S21J, and the noise equivalent area after the contrast enhancement processing is executed thereon in step S21N. Then in step S21P, the display unit 6 displays a composite image corresponding to the composite image data.

The effect similar to that of the first embodiment can thus be realized according to the imaging apparatus 10 of the fourth embodiment.

A reproduction of a color having a correct color balance cannot be realized by a simple amplification of each color component (saturation enhancement) when a part corresponding to a pixel having a color component at saturation level or noise level, and therefore, the amplification rate of each color component may be defined with reference to a surrounding color. Moreover, if an area size of the part is small, in order not to change drastically from the surrounding color, a similar correction may be performed as the surrounding color. In this case, the saturation enhancement unit may include a function of detecting an area size (e.g., number of pixels), a shape (by using a template) of a specific image part for determining the area size.

Variation of Fourth Embodiment

Figure 18:
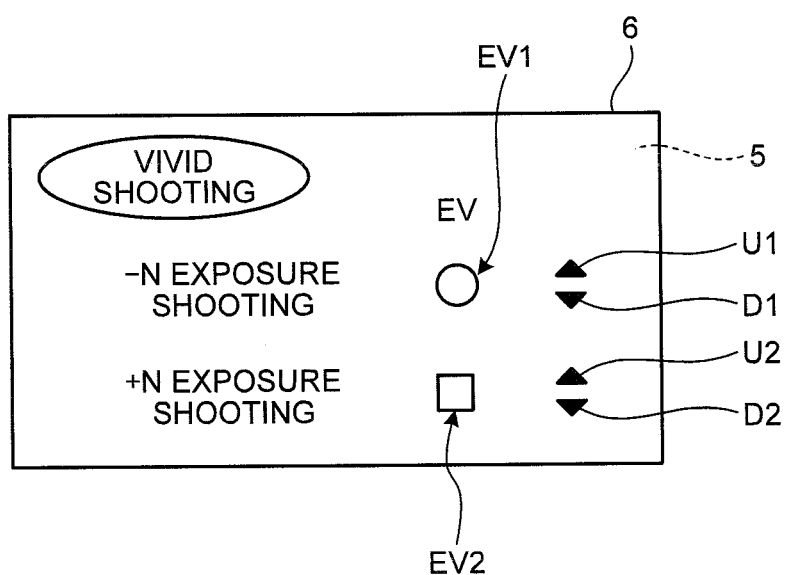
FIG. 18 is a diagram illustrating a variation of the fourth embodiment of the present invention.

FIG. 18 is a diagram illustrating a variation of the fourth embodiment of the present invention.

In the fourth embodiment, the exposure value (EV) in each of the +N exposure shooting performed in step S21H and the −N exposure shooting performed in step S21K may be the exposure value (EV) set in advance, or set on a menu screen illustrated in FIG. 18 by an operation of a camera user performed on an operating unit (touch panel) 5 and stored.

Specifically, the camera user can increase an exposure value EV1 in the −N exposure shooting by touching an operation icon U1 and decrease the exposure value EV1 in the −N exposure shooting by touching an operation icon D1. Likewise, the camera user can increase an exposure value EV2 in the +N exposure shooting by touching an operation icon U2 and decrease the exposure value EV2 in the +N exposure shooting by touching an operation icon D2.

While the fourth embodiment is adapted to perform shooting with the standard exposure (EV=0) in step S21A, shooting may be performed with proper exposure as with the second embodiment.

Another Embodiment

While the embodiments of the present invention have been described, the present invention is not to be limited by the first to fourth embodiments described above.

For example, there are an imaging element detecting white color (white) component and an imaging element detecting complimentary colors beside an imaging element detecting color signals corresponding to R, G and B. Even the same R, G or B, the color may vary depending on a property of a color filter. Therefore, R, G and B in this specification may be changed to any color components as far as a balance of the color components can be detected, and the same effect can be achieved. Moreover, the part corresponding to a pixel having a color component at saturation level or at noise level can be corrected with reference to a surrounding color.

While the image processing apparatus of the present invention is adopted to the imaging apparatus in the first to fourth embodiments, the image processing apparatus may also be adopted to another apparatus such as an electron microscope (refer to Japanese Laid-open Patent Publication No. 2012-18813, for example), a capsule endoscope (refer to Japanese Laid-open Patent Publication No. 2010-250188, for example), or an industrial endoscope (refer to Japanese Laid-open Patent Publication No. 2012-88278, for example).

Moreover, the processing flow does not necessarily have to be performed in the order illustrated in the flowchart described in each of the first to fourth embodiment, but may be modified within the range not causing any contradiction.

Furthermore, the algorithm of the processing described while using the flowchart in the present description can be described as a program. Such program may be recorded in a recording unit inside a computer or recorded in a computer-readable recording medium. The program may be recorded in the recording unit or recording medium when the computer or the recording medium is shipped as a product, or when downloaded through a communication network.

Various inventions can be formed by appropriately combining the components disclosed in the third and fourth embodiments. The third embodiment includes the invention described in Additional Items 1 to 8 as follows.

1. An image processing apparatus including an image acquisition unit that acquires a plurality of image data obtained by imaging the same subject, a scene determining unit that determines a scene at the time of shooting on the basis of the image data, a setting unit that sets a base hue on the basis of the scene at the time of shooting, and a composite image generation unit that compares corresponding areas in the plurality of image data to select an area having a hue closest to the base hue, and executes composition processing of generating composite image data formed of the selected area.

2. The image processing apparatus according to Additional Item 1, where the composition processing excludes a pixel in which a signal level of at least any of R, G, and B signals included in a color component signal is saturated.

3. The image processing apparatus according to Additional Item 1, where the composition processing excludes a pixel in which a signal level of at least any of R, G, and B signals included in a color component signal is at a noise level.

4. An imaging apparatus including the image processing apparatus according to Additional Item 1, and an imaging unit that images a subject and generates the plurality of image data.

5. The imaging apparatus according to Additional Item 4, where the plurality of image data is a plurality of image data generated by causing the imaging unit to image the same subject with a different exposure.

6. The imaging apparatus according to Additional Item 4, where the plurality of image data is a plurality of image data generated by causing the imaging unit to image the same subject with the same exposure at a predetermined time interval.

7. An image processing method executed by an image processing apparatus, the method including acquiring a plurality of image data obtained by imaging the same subject, determining a scene at the time of shooting on the basis of the image data, setting a base hue on the basis of the scene at the time of shooting, and comparing corresponding areas in the plurality of image data to select an area having a hue closest to the base hue, and generating composite image data formed of the selected area.

8. A non-transitory computer-readable recording medium in which an executable program is recorded, the program instructing a processor included in an image processing apparatus to acquire a plurality of image data obtained by imaging the same subject, determine a scene at the time of shooting on the basis of the image data, set a base hue on the basis of the scene at the time of shooting, and compare corresponding areas in the plurality of image data to select an area having a hue closest to the base hue, and generate composite image data formed of the selected area.

The fourth embodiment includes the invention described in Additional Items 1 to 9 as follows.

1. An imaging apparatus including an imaging unit that images a subject and generates image data, an imaging control unit that causes the imaging unit to image the same subject with at least a first exposure value and a second exposure value that are different from each other and generate first image data and second image data, an area determining unit that divides all pixels in the first image data into at least a first area and a second area that are different from each other on the basis of a signal level of a color component signal of each pixel in the first image data, a saturation enhancement unit that executes saturation enhancement processing of enhancing saturation of the first area as well as a second equivalent area equivalent to the second area in the second image data, and a composite image generation unit that executes composition processing of compositing the first area and the second area after the saturation enhancement processing is executed on the areas and generating composite image data.

2. The imaging apparatus according to Additional Item 1, where each pixel in the second area is a pixel in which a signal level of at least any of R, G, and B signals included in a color component signal of each pixel is saturated, and the second exposure value is an exposure value higher than the first exposure value.

3. The imaging apparatus according to Additional Item 2, further including an exposure correction unit that performs exposure correction on the second equivalent area after the saturation enhancement processing is executed in order to obtain brightness matching brightness of the first image data, where the composite image generation unit generates the composite image data by compositing the first area after the saturation enhancement processing is executed and the second equivalent area after the exposure correction is executed.

4. The imaging apparatus according to Additional Item 1, where each pixel in the second area is a pixel in which a signal level of at least any of R, G, and B signals included in a color component signal of each pixel is at a noise level, and the second exposure value is an exposure value lower than the first exposure value.

5. The imaging apparatus according to Additional Item 4, further including an exposure correction unit that performs exposure correction on the second equivalent area after the saturation enhancement processing is executed in order to obtain brightness matching brightness of the first image data, where the composite image generation unit generates the composite image data by compositing the first area after the saturation enhancement processing is executed and the second equivalent area after the exposure correction is executed.

6. The imaging apparatus according to Additional Item 5, further including a contrast enhancement unit that performs contrast enhancement processing on the second equivalent area after the exposure correction is executed, where the composite image generation unit generates the composite image data by compositing the first area after the saturation enhancement processing is executed and the second equivalent area after the contrast enhancement processing is executed.

7. An imaging method executed by an imaging apparatus, the method including imaging the same subject with at least a first exposure value and a second exposure value that are different from each other and generating first image data and second image data, dividing all pixels in the first image data into at least a first area and a second area that are different from each other on the basis of a signal level of a color component signal of each pixel in the first image data, enhancing saturation of the first area as well as a second equivalent area equivalent to the second area in the second image data, and compositing the first area and the second equivalent area after enhancing the saturation of the areas and generating composite image data.

8. A non-transitory computer-readable recording medium in which an executable program is recorded, the program instructing a processor included in an imaging apparatus to image the same subject with at least a first exposure value and a second exposure value that are different from each other and generate first image data and second image data, divide all pixels in the first image data into at least a first area and a second area that are different from each other on the basis of a signal level of a color component signal of each pixel in the first image data, enhance saturation of the first area as well as a second equivalent area equivalent to the second area in the second image data, and composite the first area and the second equivalent area after the saturation of the areas is enhanced and generate composite image data.

Note that correspondence between the fourth embodiment and Additional Items is as follows.

The standard exposure (EV=0) and the standard exposure image data according to the fourth embodiment correspond to the first exposure value and the first image data according to Additional Items, respectively. The exposure value (EV=−N, +N) and the −N and +N level image data according to the fourth embodiment correspond to the second exposure value and the second image data according to Additional Items, respectively. The normal area according to the fourth embodiment corresponds to the first area according to Additional Items. The saturated area and the noise area according to the fourth embodiment correspond to the second area according to Additional Items. The saturation enhancement unit 73 according to the fourth embodiment corresponds to the area determining unit and the saturation enhancement unit according to Additional Items. The saturation equivalent area and the noise equivalent area according to the fourth embodiment correspond to the second equivalent area according to Additional Items. Steps S21A, S21H, and S21K according to the fourth embodiment correspond to "imaging the same subject with at least the first exposure value and the second exposure value that are different from each other and generating the first image data and the second image data" according to Additional Items. Step S21C according to the fourth embodiment corresponds to "dividing all the pixels in the first image data into at least the first area and the second area that are different from each other on the basis of the signal level of the color component signal of each pixel in the first image data" according to Additional Items. Steps S21F, S21I, and S21L according to the fourth embodiment correspond to "enhancing the saturation of the first area and the second equivalent area equivalent to the second area in the second image data" according to Additional Items. Step S21O according to the fourth embodiment corresponds to "compositing the first area and the second equivalent area after the saturation of the areas is enhanced and generating the composite image data" according to Additional Items.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
an image acquisition unit configured to acquire first image data of a subject;
a classifying unit configured to classify areas of the entire first image data into a saturated area formed of one or more saturated pixels, a noise area formed of one or more noise pixels, and a normal area formed of one or more pixels other than the saturated pixels and the noise pixels;
a first saturation enhancement unit configured to enhance saturation of the pixel in the normal area of the first image data;
a second saturation enhancement unit configured to control the image acquisition unit to acquire second image data taken with an exposure value higher than an exposure value of the first image data and enhance saturation of a pixel in the second image data corresponding to the saturated pixel in the saturated area of the first image data;
a third saturation enhancement unit configured to control the image acquisition unit to acquire third image data taken with fill exposure value lower than the exposure value of the first image data and enhance saturation of a pixel in the third image data corresponding to the noise pixel in the noise area of the first image data;

a composite image generation unit configured to generate composite image data formed of the saturation enhanced pixel in the normal area of the first image data, the saturation enhanced pixel in the second image data and the saturation enhanced pixel in the third image data.

2. The image processing apparatus of claim 1 wherein the classifying unit is configured to classify an area of the first image as a saturated area formed of one or more saturated pixels by, for each of a plurality of pixels of the first image, (1) determining whether the signal levels of the red, green and blue components of the pixel are all greater than a predetermined saturation level, and (2) responsive to a determination that all of the signal levels of the red, green and blue components of the pixel are greater than the predetermined saturation level, classifying the pixel as a saturated pixel, and otherwise, responsive to a determination that not all of the signal levels of the red, green and blue components of the pixel are greater than the predetermined saturation level, not classifying the pixel as a saturated pixel.

3. The image processing apparatus of claim 1 wherein the classifying unit is configured to classify an area of the first image as a noise area formed of one or more noise pixels by, for each of a plurality of pixels of the first image, (1) determining whether the signal levels of the red, green and blue components of the pixel are all less than a predetermined noise level, and (2) responsive to a determination that all of the signal levels of the red, green and blue components of the pixel are less than the predetermined noise level, classifying the pixel as a noise pixel, and otherwise, responsive to a determination that not all of the signal levels of the red, green and blue components of the pixel are less than the predetermined noise level, not classifying the pixel as a noise pixel.

4. An imaging apparatus comprising:
an image acquisition unit configured to acquire first image data of a subject; and
an image processing apparatus including:
a classifying unit configured to classify areas of the entire first image data into a saturated area formed of one or more saturated pixels, a noise area formed of one or more noise pixels, and a normal area formed of one or more pixels other than the saturated pixels and the noise pixels;
a first saturation enhancement unit configured to enhance saturation of the pixel in the normal area of the first image data;
a second saturation enhancement unit configured to control the image acquisition unit to acquire second image data taken with an exposure value higher than an exposure value of the first image data and enhance saturation of a pixel in the second image data corresponding to the saturated pixel in the saturated area of the first image data;
a third saturation enhancement unit configured to control the image acquisition unit to acquire third image data taken with fill exposure value lower than the exposure value of the first image data and enhance saturation of a pixel in the third image data corresponding to the noise pixel in the noise area of the first image data;
a composite image generation unit configured to generate composite image data formed of the saturation enhanced pixel in the normal area of the first image data, the saturation enhanced pixel in the second image data and the saturation enhanced pixel in the third image data.

5. The imaging apparatus of claim 4 wherein the classifying unit is configured to classify an area of the first image as a saturated area formed of one or more saturated pixels by, for each of a plurality of pixels of the first image, (1) determining whether the signal levels of the red, green and blue components of the pixel are all greater than a predetermined saturation level, and (2) responsive to a determination that all of the signal levels of the red, green and blue components of the pixel are greater than the predetermined saturation level, classifying the pixel as a saturated pixel, and otherwise, responsive to a determination that not all of the signal levels of the red, green and blue components of the pixel are greater than the predetermined saturation level, not classifying the pixel as a saturated pixel.

6. The imaging apparatus of claim 4 wherein the classifying unit is configured to classify an area of the first image as a noise area formed of one or more noise pixels by, for each of a plurality of pixels of the first image, (1) determining whether the signal levels of the red, green and blue components of the pixel are all less than a predetermined noise level, and (2) responsive to a determination that all of the signal levels of the red, green and blue components of the pixel are less than the predetermined noise level, classifying the pixel as a noise pixel, and otherwise, responsive to a determination that not all of the signal levels of the red, green and blue components of the pixel are less than the predetermined noise level, not classifying the pixel as a noise pixel.

7. An image processing method executed by an image processing apparatus, the method comprising:
acquiring first image data of a subject;
classifying areas of the first image data into a saturated area formed of one or more saturated pixels, a noise area formed of one or more noise pixels, and a normal area formed of one or more pixels other than the saturated pixels and the noise pixels;
enhancing saturation of the pixel in the normal area of the first image data;
acquiring second image data taken with an exposure value higher than an exposure value of the first image data;
enhancing saturation of a pixel in the second image data corresponding to the saturated pixel in the saturated area of the first image data;
acquiring third image data taken with fill exposure value lower than the exposure value of the first image data and enhance saturation of a pixel in the third image data corresponding to the noise pixel in the noise area of the first image data; and
generating composite image data formed of the saturation enhanced pixel in the normal area of the first image data, the saturation enhanced pixel in the second image data and the saturation enhanced pixel in the third image data.

8. The image processing method of claim 7 wherein the act classifying classifies an area of the first image as a saturated area formed of one or more saturated pixels by, for each of a plurality of pixels of the first image, (1) determining whether the signal levels of the red, green and blue components of the pixel are all greater than a predetermined saturation level, and (2) responsive to a determination that all of the signal levels of the red, green and blue components of the pixel are greater than the predetermined saturation level, classifying the pixel as a saturated pixel, and otherwise, responsive to a determination that not all of the signal levels of the red, green and blue components of the pixel are greater than the predetermined saturation level, not classifying the pixel as a saturated pixel.

9. The image processing method of claim 7 wherein the act classifying classifies an area of the first image as a noise area formed of one or more noise pixels by, for each of a plurality of pixels of the first image, (1) determining whether the signal levels of the red, green and blue components of the pixel are all less than a predetermined noise level, and (2) responsive to a determination that all of the signal levels of the red, green and blue components of a pixel are less than the predetermined noise level, classifying the pixel as a noise pixel, and otherwise, responsive to a determination that not all of the signal levels of the red, green and blue components of the pixel are less than the predetermined noise level, not classifying the pixel as a noise pixel.

10. A non-transitory computer-readable recording medium in which an executable program is recorded, the program instructing a processor included in an image processing apparatus to:
acquire first image data of a subject;
classify areas of the first image data into a saturated area formed of one or more saturated pixels, a noise area formed of one or more noise pixels, and a normal area formed of one or more pixels other than the saturated pixels and the noise pixels;
enhance saturation of the pixel in the normal area of the first image data;
acquire second image data taken with an exposure value higher than an exposure value of the first image data;
enhance saturation of a pixel in the second image data corresponding to the saturated pixel in the saturated area of the first image data;
acquire third image data taken with fill exposure value lower than the exposure value of the first image data and enhance saturation of a pixel in the third image data corresponding to the noise pixel in the noise area of the first image data; and
generate composite image data formed of the saturation enhanced pixel in the normal area of the first image data, the saturation enhanced pixel in the second image data and the saturation enhanced pixel in the third image data.

11. A non-transitory computer-readable recording medium of claim 10 wherein the act classifying classifies an area of the first image as a saturated area formed of one or more saturated pixels by, for each of a plurality of pixels of the first image, (1) determining whether the signal levels of the red, green and blue components of the pixel are all greater than a predetermined saturation level, and (2) responsive to a determination that all of the signal levels of the red, green and blue components of the pixel are greater than the predetermined saturation level, classifying the pixel as a saturated pixel, and otherwise, responsive to a determination that not all of the signal levels of the red, green and blue components of the pixel are greater than the predetermined saturation level, not classifying the pixel as a saturated pixel.

12. A non-transitory computer-readable recording medium of claim 10 wherein the act classifying classifies an area of the first image as a noise area formed of one or more noise pixels by, for each of a plurality of pixels of the first image, (1) determining whether the signal levels of the red, green and blue components of the pixel are all less than a predetermined noise level, and (2) responsive to a determination that all of the signal levels of the red, green and blue components of the pixel are less than the predetermined noise level, classifying the pixel as a noise pixel, and otherwise, responsive to a determination that not all of the signal levels of the red, green and blue components of the pixel are less than the predetermined noise level, not classifying the pixel as a noise pixel.

13. The image processing apparatus according to claim 1, wherein
the saturation enhancement unit is configured to execute the saturation enhancement processing while keeping a hue unchanged.

* * * * *